US008225402B1

(12) United States Patent
Averbuch et al.

(10) Patent No.: US 8,225,402 B1
(45) Date of Patent: Jul. 17, 2012

(54) ANOMALY-BASED DETECTION OF SQL INJECTION ATTACKS

(76) Inventors: Amir Averbuch, Jaffa (IL); Aviram Shmueli, Ramat Hasharon (IL); Gil David, Shoresh (IL)

( * ) Notice: Subject to any disclaimer, the term of this patent is extended or adjusted under 35 U.S.C. 154(b) by 600 days.

(21) Appl. No.: 12/420,681

(22) Filed: Apr. 8, 2009

Related U.S. Application Data

(60) Provisional application No. 61/043,442, filed on Apr. 9, 2008.

(51) Int. Cl.
*H04L 29/06* (2006.01)
(52) U.S. Cl. ............... 726/23; 726/22; 717/141
(58) Field of Classification Search .................... 726/22, 726/23; 717/141
See application file for complete search history.

(56) References Cited

U.S. PATENT DOCUMENTS

| | | | |
|---|---|---|---|
| 7,444,331 B1* | 10/2008 | Nachenberg et al. | 1/1 |
| 2009/0049547 A1* | 2/2009 | Fan | 726/22 |
| 2009/0216752 A1* | 8/2009 | Terui et al. | 707/5 |
| 2009/0248678 A1* | 10/2009 | Okamoto et al. | 707/5 |

OTHER PUBLICATIONS

Ingham et al.—Comparing Anomaly Detection Techniques fro HTTP. RAID 07 Proceeding of the 10th International Conference on Recent Advnaces in Intrusion Detection. Springer-Verlag Berlin. Heidelberg 2007. http://dl.acm.org/citation.cfm?id=1776439.*
Coifman et al. Diffusion Maps. Science Direct. Jun. 19, 2006. http://www.cis.temple.edu~latecki/Courses/RobotFall08/Papers/DiffusionMaps06.pdf.*
W.G Halfond and A. Orso, "Amnesia: Analysis and Monitoring for NEutralizing SQL-Injection Attacks", Proceedings of the IEEE and ACM International Conference on Automated Soft, ACM 2005.
T. Pietraszek and C. V. Berghr, "Defending Against Injection Attacks through Context-Sensitive String Evaluation", Proceedings of Recent Advances in Intrusion Detection (RAID2, Raid 2005.
G. T. Buehrer, B. W. Weide, and P. A. G. Sivilotti, "Using Parse Tree Validation to Prevent SQL Injection Attacks", International Workshop on Software Engineering and Middlewa, ACM 2005.
S. W. Boyd and A. D. Keromytis, "SQLrand: Preventing SQL Injection Attacks", Proceedings of the 2nd Applied Cryptography and Network Security (ACNS) Conference, pp. 292-302, ACNS 2004.
K. Wang, J. Parekh and S. Stolfo, "Anagram: a content anomaly detector resistant to mimicry attack", Recent Advances in Intrusion Detection (RAID), 2006, pp. 226-248.
D. Achlioptas, "Database-friendly random projections", in Proceedings of the ACM Symposium on the Principles of Database Systems, pp. 274-281, 2001.
R.R. Coifman and S. Lafon, "Diffusion maps", Applied and Computational Harmonic Analysis, 21(1), 5-30, 2006.

\* cited by examiner

*Primary Examiner* — Jung Kim
*Assistant Examiner* — Ngoc D Nguyen
(74) *Attorney, Agent, or Firm* — Nathan & Associates Patent Agents Ltd.; Menachem Nathan

(57) ABSTRACT

A method for detecting a SQL injection attack comprises a training phase and a detection phase. In the training phase, a plurality of SQL queries is transformed into a respective plurality of SQL token domain queries which are processed using a n-gram analysis to provide a threshold and an averaging vector. In the detection phase, each newly arrived SQL query is transformed into a new SQL token domain query, and the n-gram analysis is applied together with the averaging vector and the threshold to each new SQL token domain query to determine if the new SQL query is normal or abnormal. The detection may be online or offline.

19 Claims, 19 Drawing Sheets

```php
<?php
$db_name="enron_db"
$user="user"
$password="password"
$db_host = 'localhost'

$con = mysql_connect($db_host,$user,$password);
mysql_select_db($db_name,$con);
```
                                                                          A

```
$query = "SELECT * FROM enron.employeelist WHERE";
```
                                                                          B

```
$lastName = $_GET['lastName'];
$firstName = $_GET['firstName'];
```
                                                                          C

```
if ($firstName and $lastName)
        $query = $query . "firstName = '".$firstName."'" . " lastName = '".$lastName."'";
else
        return;
```

```
$result = mysql_query($query);
```
                                       D
                                                                          E

```
echo "<table border='1'>
   <tr>
   <th> eid </th>
   <th> firstName </th>
   <th> lastName </th>
   <th> Email_id </th>
   </tr>";
while ($row = mysql_fetch_array($result)) {
        echo "<tr>";
   echo "<td>" . $row['eid'] . "</td>";
   echo "<td>" . $row['firstName'] . "</td>";
   echo "<td>" . $row['lastName'] . "</td>";
   echo "<td>" . $row['Email_id'] . "</td>";
   echo "</tr>";
}
echo "</table>";
if (mysql_num_rows($result) == 0)
   mysql_close($con);
?>
```

FIG. 7

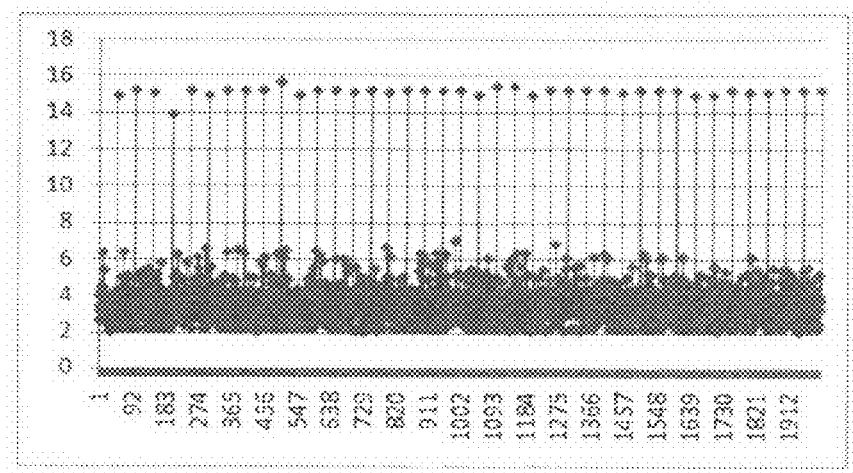
4-gram
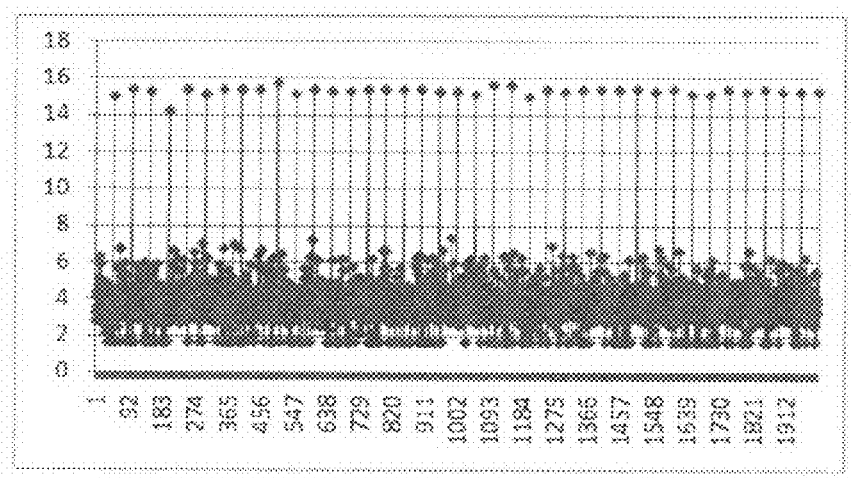
5-gram
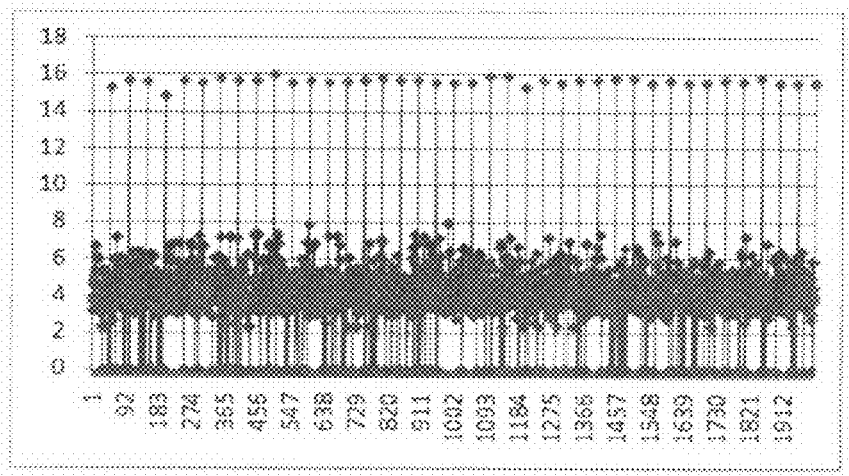
6-gram
FIG. 8b

ANOMALY-BASED DETECTION OF SQL INJECTION ATTACKS

CROSS REFERENCE TO RELATED APPLICATIONS

This application claims the benefit of U.S. provisional patent application 61/043,442, filed Apr. 9, 2008, which is incorporated herein by reference in its entirety.

FIELD OF THE INVENTION

The invention relates in general to methods and systems for detection of anomalies (abnormalities) that deviate from normal behavior in multi-dimensional data and more particularly to online based detection of Structured Query Language (SQL) injection attacks.

BACKGROUND OF THE INVENTION

Web applications have become a popular way to provide services over the Internet. Common applications include activities such as reading news and emails, shopping online and paying bills. As the use of these applications grows, we witness an increase in their vulnerabilities to attacks via the Internet. One of the most dangerous attacks is "SQL injection", performed by malicious insertion of crafted SQL queries into a vulnerable web page. Through SQL injection, an attacker gains unrestricted and unauthorized access to the underlying database. This may result in stealing of confidential financial information such as credit card numbers, modification of sensitive and personal data records, and more.

The challenge of a security system facing these types of attacks is to perform full-proof intrusion detection without any misdetections and false alarms. To achieve this, most security systems use signatures developed and gathered manually. This approach is problematic, because security systems using signatures can only detect attacks which are already known but cannot detect attacks with slight modifications or new attacks. Thus, known anomaly detection based approaches either fail to address the full range of SQL injection attacks or have technical limitations that prevent their adoption and deployment in real world installations.

SQL Injection Attacks

SQL is a textual language used to interact with relational databases. It is a standard interactive and programming language for querying, modifying and managing databases. A "query" is a typical execution unit and includes a collection of SQL statements. SQL statements can modify the structure of a database, add or remove schemes and manipulate database content.

A SQL attack is performed by embedding SQL statements and meta-characters into a query. To launch an attack, a malicious user needs to craft input strings and to send them to an application. The malicious user may then gain unauthorized access to the database, observe sensitive and confidential data, leak the data out of the web site, or even destroy the data in the database. Web applications, which read inputs from users (e.g. through web forms) and use these inputs to compose a query to the underlying database are vulnerable. A SQL attack is caused by insufficient input validation and inability to perform such input validation. Hackers have developed new methods to bypass these validations and to hack into applications. Moreover, the use of input validation techniques is labor consuming, which makes them impractical for use.

Even though the vulnerabilities that lead to SQL attacks are well known and well understood, such attacks continue to emerge due to lack of effective techniques for detecting and preventing them. Programming techniques which utilize sophisticated input validation may prevent some of these attacks, but are usually ineffective.

SQL Injection Attacks Examples.

We show several ways in which an attack can exploit known vulnerabilities. Three different examples of attacks are given. These attacks show how a potential attacker can modify the original intention of the query as designed by its programmer. The examples are based upon the following typical query:
SELECT * FROM employeelist WHERE firstName="'.$firstName."' AND lastName="'.$lastName."'
The query performs a search for an employee record in a database table called employeelist according to given first and last names. If such a record exists, then it is returned. Otherwise, nothing is returned. Parameters such as first and last names are supplied by the application user through, for example, a web form. The following examples demonstrate that by entering specific meta-characters and crafted strings as parameters, the original behavior of the query changes. As a result, a complete employeelist database table is retrieved (instead of the one searched employee record).

Example 1 demonstrates a tautology-based attack. The user submits for firstName and lastName the values some_string and 'OR 'b'='b, respectively. Therefore, the WHERE clause is evaluated to be true. The constructed query looks as follows:
SELECT * FROM employeelist WHERE firstName='some_string' AND lastName="OR 'b'='b'

Example 2 demonstrates a tautology-based attack combined with a "commenting" technique. The user submits for firstName and lastName the values ' OR 1=1# and some_string, respectively. The SQL special character '#' denotes the beginning of a comment. Therefore, part of the WHERE clause (until the '#' character) is evaluated to be true, while the rest of it becomes irrelevant due to the presence of the comment sign. The constructed query looks as follows:
SELECT * FROM employeelist WHERE firstName=∂OR 1=1#' AND lastName='some_string'

Example 3 demonstrates the use of a "UNION SELECT" attack combined with a "commenting" technique. The SQL 'UNION' command combines the results of two queries. The attacker submits for firstName and lastName the values 'union select * from employeelist# and some_string, respectively. By doing that, the attacker adds another injected query, which can be fully controlled. The returned result is a union of the first query and the second query, which is an injected query. The constructed query looks as follows:
SELECT * FROM employeelist WHERE firstName="union select * from employeelist #' and lastName='some_string'

Related Work

A wide range of solutions that address the SQL injection phenomena have been proposed over the years. These solutions range from development of new programming techniques to fully automated frameworks for detection and prevention of these attacks. Some of the latest methods which handle SQL injections are reviewed next.

a) AMNESIA (see W. G. Halfond and A. Orso, "AMNESIA: Analysis and Monitoring for NEutralizing SQL-Injection Attacks", Proceedings of the IEEE and ACM International Conference on Automated Software Engineering (ASE 2005), Long Beach, Calif., USA, November 2005) is a model based technique which uses static analysis and runtime monitoring. It is based on the assumption that it is possible to describe a model for legitimate SQL queries by analyzing the source code that generates them. In the static analysis part, AMNESIA uses offline program analysis to build a model for the legitimate and expected queries that can be generated by the application. It scans the source code in order to find the points where SQL queries are constructed. It then builds a model for each point. In the dynamic part, it monitors the dynamically generated queries at runtime and checks their compliance with the statically generated model. Queries that violate the model represent potential hazard and are thus prevented from being executed on the database while being reported.

b) CSSE (see T. Pietraszek and C. V. Berghe, "Defending Against Injection Attacks through Context-Sensitive String Evaluation", Proceedings of Recent Advances in Intrusion Detection (RAID2005), 2005) is a technique for defending against SQL injection attacks by tracking the query fragments origin and taint information (if existing). This technique uses a context sensitive analysis to detect and reject queries which include untrusted inputs. At the first step, it marks with metadata all the user originated data in order to keep track of the fragments' origin. This is done by overriding Personal Home Page (PHP) interpreter functions. PHP is a scripting language originally designed for producing dynamic web pages. This way, the metadata allows distinguishing between developer-provided and user-provided strings. Then, it intercepts all the application programming interface (API) calls to the database layer. CSSE checks if there is any metadata associated with the SQL expression and then performs the necessary checks on the un-trusted parts.

c) Parse-Tree (see G. T. Buehrer, B. W. Weide, and P. A. G. Sivilotti, "Using Parse Tree Validation to Prevent SQL Injection Attacks", International Workshop on Software Engineering and Middleware (SEM), 2005) is based on comparing the grammatical structure of a SQL query and an expected query model at runtime. The first one is the original query, which does not include the user's input tokens. The second one is the resulting query after incorporating the user's input. The comparison is done between the parse trees of these queries. This technique determines if the two queries are equal by comparing their tree structures. It uses an API which provides parsing and string building capabilities. Concatenation of SQL query fragments is done using this API.

d) SQLRand (see S. W. Boyd and A. D. Keromytis, "SQL-rand: Preventing SQL Injection Attacks", Proceedings of the 2nd Applied Cryptography and Network Security (ACNS) Conference, pages 292-302, June 2004) performs instruction-set randomization of SQL keywords. It provides a framework which allows developers to create SQL queries using encoded keywords instead of normal ones. The SQL standard keywords are manipulated by appending thereto a random integer. This is something that cannot easily be guessed by an attacker. A proxy filter intercepts these queries to the database. Its primary obligation is to validate the random SQL query, de-randomize the keywords and then forward the SQL query to the database. A query, that includes a user attack, is evaluated as an invalid expression because hard-coded keywords are randomized while the user's input keywords are not. The system design includes a library for the developer to rewrite the keywords.

All the above proposed solutions suffer from the same deployment problem. Since every solution intercepts a SQL query after incorporating the user's input, the detection system cannot be installed physically before the web server itself. Since large organizations have many web servers, these systems have to be duplicated. This makes them less suited for deployment.

Yet another anomaly detection solution for the SQL injection attack problem is provided in U.S. patent application Ser. No. 12/263,473 by Averbuch et al., filed Nov. 2, 2008. In this solution, multidimensional data which is reduced in dimension to form clusters of normal data, with abnormal data points residing outside the clusters.

FIG. 1 illustrates schematically an exemplary organizational network architecture. The network architecture may consist of several web servers (left side of the figure) where each server connects to a different database (right side of the figure). All web servers are connected through a main switch. In this architecture, the proposed solutions need to be located at segments C or D. This constraint imposes system duplication—one solution for each web server. Another drawback of these solutions is related to the efforts needed in the integration and the required modifications to existing infrastructure. Integration of these solutions into a commercial network will consume high managerial efforts. For example, AMNESIA requires accessibility to every written source code (old or new) which approaches the database. CSSE overrides the PHP interpreter functions. The Parse-Tree and SQLRand methods also dictate a revision and update of all previously written source codes. In addition, some of the solutions are not transparent to the developer. By using the Parse-Tree method, the developer needs to adapt himself to a new programming method. By using SQLRand, the user has to use a tool that rewrites all the SQL keywords. To summarize, the reviewed solutions are impractical to efficiently handle SQL injection attacks. These solutions suffer from problems of deployment, integration and transparency to the developer.

SUMMARY OF THE INVENTION

The solution provided in the invention is anomaly based, in contrast with signature-based solutions such as SNORT®, which is an open source network intrusion prevention and detection utilizing a rule-driven language that combines the benefits of signature, protocol and anomaly based inspection methods. The present solution is based on the idea that "normal" queries have certain common characteristics (features). These features are used to form a statistical model. Normal queries satisfy this model, whereas a SQL injection attack violates it. Thus, a SQL injection attack is classified as having an abnormal behavior.

The normal behavior of queries sent to a database is learned in a training phase by extracting relevant features from them and by building a unique, "normal" profile that identifies them. Then, each newly arrived query sent to the database is analyzed in a detection phase according to the normal profile. Every deviation from the normal profile is classified as an anomaly.

The training phase includes processing of training data which includes several SQL queries. Each SQL query in the training data is transformed into a "SQL token domain query", in a token domain characterized by an alphabet built from elements called tokens. Each symbol of the SQL query is searched for its associated token and is replaced with the associated token. A n-gram operation (or "analysis") is applied to the SQL token domain queries to provide a threshold and an averaging vector.

In the detection phase, each newly arrived (or "new") SQL query is transformed into a new SQL token domain query. As in the training phase, each symbol of the SQL query is searched for its associated token and is replaced by it. The n-gram operation is applied together with the averaging vector and the threshold to the SQL token domain query to determine if the newly arrived SQL query is normal or abnormal.

Together with the ability to successfully detect SQL injection attacks, the solution provided herein can be deployed into the network's root (FIG. 1, segments A and B). In addition, it can be integrated into an existing infrastructure smoothly and transparently without the need to access any source code or to impose new programming methodologies.

According to the invention there is provided a method for detecting a SQL injection attack, including the steps of transforming a new SQL query into a new SQL token domain query and applying a n-gram analysis together with a threshold and an averaging vector to the new SQL token domain query to determine whether or not the SQL query is an injection attack query. In some embodiments, these steps are performed online. In some embodiments, these steps are performed offline.

In some embodiments of the method, the steps of transforming a new SQL query into a new SQL token domain query and applying a n-gram analysis together with a threshold and an averaging vector to the new SQL token domain query are preceded by the steps of transforming a plurality of SQL queries into respective SQL token domain queries and applying a n-gram analysis to the SQL token domain queries to obtain the threshold and the averaging vector. The latter two steps are performed offline.

According to the invention there is provided a computer-readable storage medium having computer readable code embodied therein, the computer-readable code used for detecting a SQL injection attack and comprising program code for transforming a new SQL query into a new SQL token domain query and program code for applying a n-gram analysis together with a threshold and an averaging vector to the new SQL token domain query to determine whether or not the SQL query is an injection attack query. In some embodiments, the computer-readable code further comprises program code for transforming a plurality of SQL queries into respective SQL token domain queries and program code for applying a n-gram analysis to the SQL token domain queries to obtain the threshold and the averaging vector.

According to the invention there is provided a method for detecting a SQL injection attack, comprising the steps of: in a training procedure, obtaining a threshold and an averaging vector from a plurality of SQL token domain queries; and, in a detection procedure, applying a n-gram analysis together with the threshold and the averaging vector to a new SQL token domain query to determine whether or not the SQL query is an injection attack query.

The anti-SQL injection attack solution provided by the invention was evaluated empirically through tests on real and simulated datasets and exhibited excellent results.

Mathematical Background

N-Gram Data Analysis

A n-gram is a sub-sequence of n overlapping items in a given sequence. The analyzed items are symbols that can be either characters or words. n-gram models are widely used in various areas of statistical natural language processing where it is applied to predict and validate grammatical inferences. Other common fields are signal processing, speech recognition, cryptography, network intrusion detection systems (see K. Wang, J. Parekh and S. Stolfo, "Anagram: a content anomaly detector resistant to mimicry attack", Recent Advances in Intrusion Detection (RAID), 2006, pp. 226-248) and more. For example, the 2-gram character model in the sentence "good evening everyone" is 'go', 'oo', 'od', . . . , 'ne'. By using the n-gram model, one builds a histogram which represents the frequency of any sequence in an input sentence.

In our case, we apply the n-gram model to SQL queries which have already changed their textual representation to a token representation. A n-gram histogram for such a query has 12" bins, since each item can be one of 12 possible tokens. The n-gram processing generates large matrices. To make this processing practical, the matrices dimensionality is reduced by applying the random projection (RP) algorithm described next.

Random Projection

Random projection is a technique for dimensionality reduction. In RP, the original high-dimensional data is projected onto a lower-dimensional subspace using a random matrix whose columns have unit lengths. Although it is a "crude" technique, RP has been found to be computationally efficient and sufficiently accurate for dimensionality reduction of high-dimensional data sets.

Let $X_{m \times n}$ be a matrix of size m×n, m is the number of observations (rows) and n is the original dimensionality of the data (columns). Let k be the desired, reduced dimensionality of the data (k<<n). Let $R_{n \times k}$ be a random matrix of size n×k where every column i, $1 \leq i \leq k$ is randomly distributed and has unit length. Therefore, $X_{m \times k}^{RP}$ is the projection of the original data X onto a lower k-dimensional subspace using the random matrix R: $X_{m \times k}^{RP} = X_{m \times n} \cdot R_{n \times k}$.

There are several ways how to choose random matrix R. Most often, the elements $R_{ij}$ of R are Gaussian distributed, but there are other possibilities. Two choices with simpler distributions were proposed in D. Achlioptas, "Database-friendly random projections", in Proceedings of the ACM Symposium on the Principles of Database Systems, pp. 274-281, 2001:

$$R_{ij} = \begin{cases} +1 & \text{with probability } \frac{1}{2} \\ -1 & \text{with probability } \frac{1}{2} \end{cases}$$

$$R_{ij} = \sqrt{3} \begin{cases} +1 & \text{with probability } \frac{1}{6} \\ 0 & \text{with probability } \frac{2}{3} \\ -1 & \text{with probability } \frac{1}{6} \end{cases}.$$

Both distributions reduce the computational time of the projection of $X_{m \times n} \cdot R_{n \times k}$ since the computations can be performed using integer arithmetic. The second distribution yields a sparse matrix where only one-third of the operations are needed. Therefore, for this distribution, the computational projection time is even faster.

BRIEF DESCRIPTION OF THE DRAWINGS

The invention is herein described, by way of example only, with reference to the accompanying drawings, wherein:

FIG. 7 displays PHP code example;

DETAILED DESCRIPTION OF THE INVENTION

Building the SQL Token Domain Query

Figure 1:
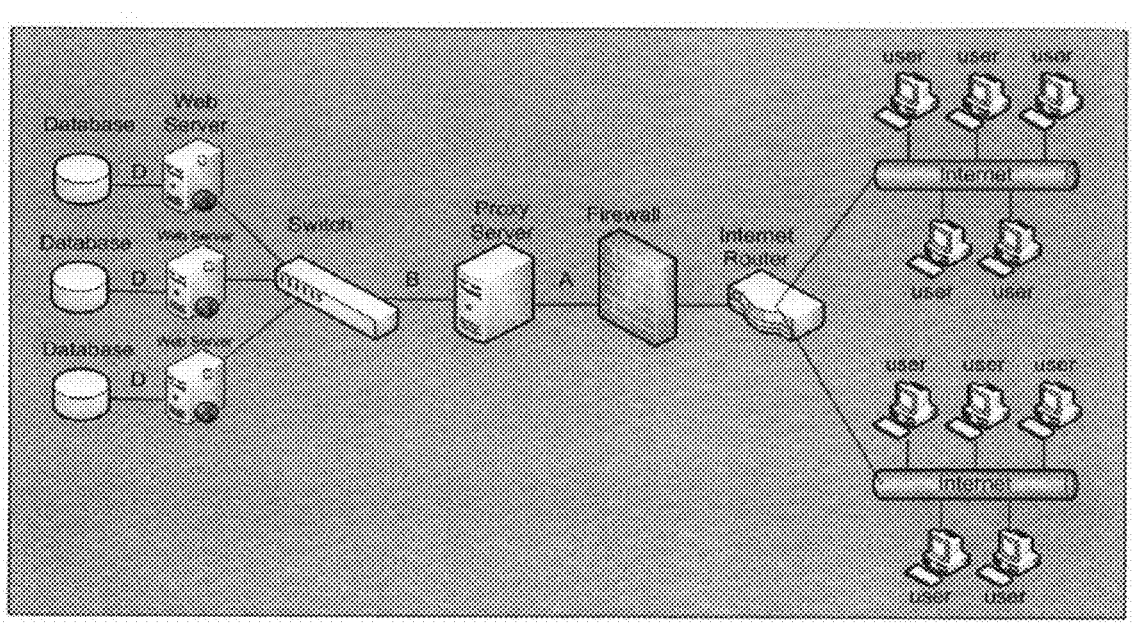
FIG. 1 displays general network architecture.

The model for transforming a SQL query into a SQL token domain query was developed according to certain guidelines:

1. Characters or words with a similar SQL grammatical meaning should be grouped under the same token.
2. The use of a larger number of tokens enables to get a more accurate description of different queries.

The different tokens with their associated symbols are described in Tables 1 and 2. Table 1 describes the token classification:

TABLE 1

| Token name | Description |
|---|---|
| Command | SQL commands: SELECT, INSERT, UPDATE, etc |
| Support | SQL reserved words which are not commands: FROM, WHERE, LIKE, etc |
| Log | SQL logical conditions: AND, OR, NOT, etc |
| Punc | SQL punctuation signs: ( ), [ ], *, etc |
| Comm | SQL comments signs: -, #, etc |
| Math | SQL mathematical signs: +, −, /, etc |
| Comp | SQL comparison signs: <, ≦, >, ≧, etc |
| Quote | SQL quotation marks: ', ", etc |
| Identifier | Table and column names, etc |
| Literal | Values which relate to user's input |

In addition, two location tokens were added: 'begin'—to mark the beginning of a query, and 'end'—to mark the end of a query. These two tokens enhance the representation accuracy level. This is due to the fact that sometimes the location of a SQL phrase can indicate whether it is valid or suspicious. Table 2 describes the location tokens.

TABLE 2

| Token name | Description |
|---|---|
| Begin | The beginning of a SQL query |
| End | The end of SQL query |

Following is an example, which is a regular SQL query that demonstrates this process:

SELECT firstName,lastName,Address WHERE Age<50

The tokens-based representation is as follows:

command-identifier-punc-identifier-punc-identifier-support-identifier-comp-literal By adding the location tokens, the final representation becomes:

begin-command-identifier-punc-identifier-punc-identifier-support-identifier-comp-literal-end N-Gram Statistics of the SQL Token Domain Query We apply the n-gram model to SQL token domain queries. For example, by applying a 2-gram on the previously given representation begin-command-identifier-punc-identifier-punc-identifier-support-identifier-comp literal-end we get the token frequency in a 2-gram model shown in Table 3:

TABLE 3

| 2-gram sequence | Frequency |
|---|---|
| begin-commad | 1 |
| command-identifier | 1 |
| identifier-punc | 2 |
| punc-identifier | 2 |
| identifier-support | 1 |
| support-identifier | 1 |
| identifier-comp | 1 |
| comp-literal | 1 |
| literal-end | 1 |
| rest of sequences | 0 |

Application of a 3-gram model to the same representation produces the token frequency in a 3-gram model shown in Table 4:

TABLE 4

| 3-gram sequence | Frequency |
|---|---|
| begin-commad-identifier | 1 |
| command-identifier-suuport | 1 |
| identifier-support-identifier | 1 |
| support-identifier -comp | 1 |
| identifier-comp-quote | 1 |
| comp-quote-literal | 1 |
| quote-literal-quote | 1 |
| literal-quote-end | 1 |
| rest of sequences | 0 |

By increasing n, rarer sequences are identified. This may reduce the number of false negative detections (attacks which are not identified). The output from this syntactic analysis process includes a matrix that describes the statistics of the frequency of the n-gram syntax in SQL queries. Since for the SQL syntactic analysis we defined 12 different tokens, the output matrix includes $12^n$ features for every SQL query. This output matrix is the input for the SQL injection attack detection processes (training and detection). The above feature choice is one option. There can be other options to choose features.

Intrusion Detection Process of SQL Injection Attacks

An exemplary process (method) and algorithm for detection of SQL injection attacks is described next. The process includes two steps: offline training from designated datasets and online detection of newly arrived SQL queries.

1. Offline Training Phase: Statistical data is obtained from the training dataset through learning. The output of this phase is a statistical model that is used in the detection of anomalies in the detection phase;
2. Detection Phase: Classification of newly arrived queries as normal or abnormal. The classification can be offline or online.

Process Outline

Figure 2:
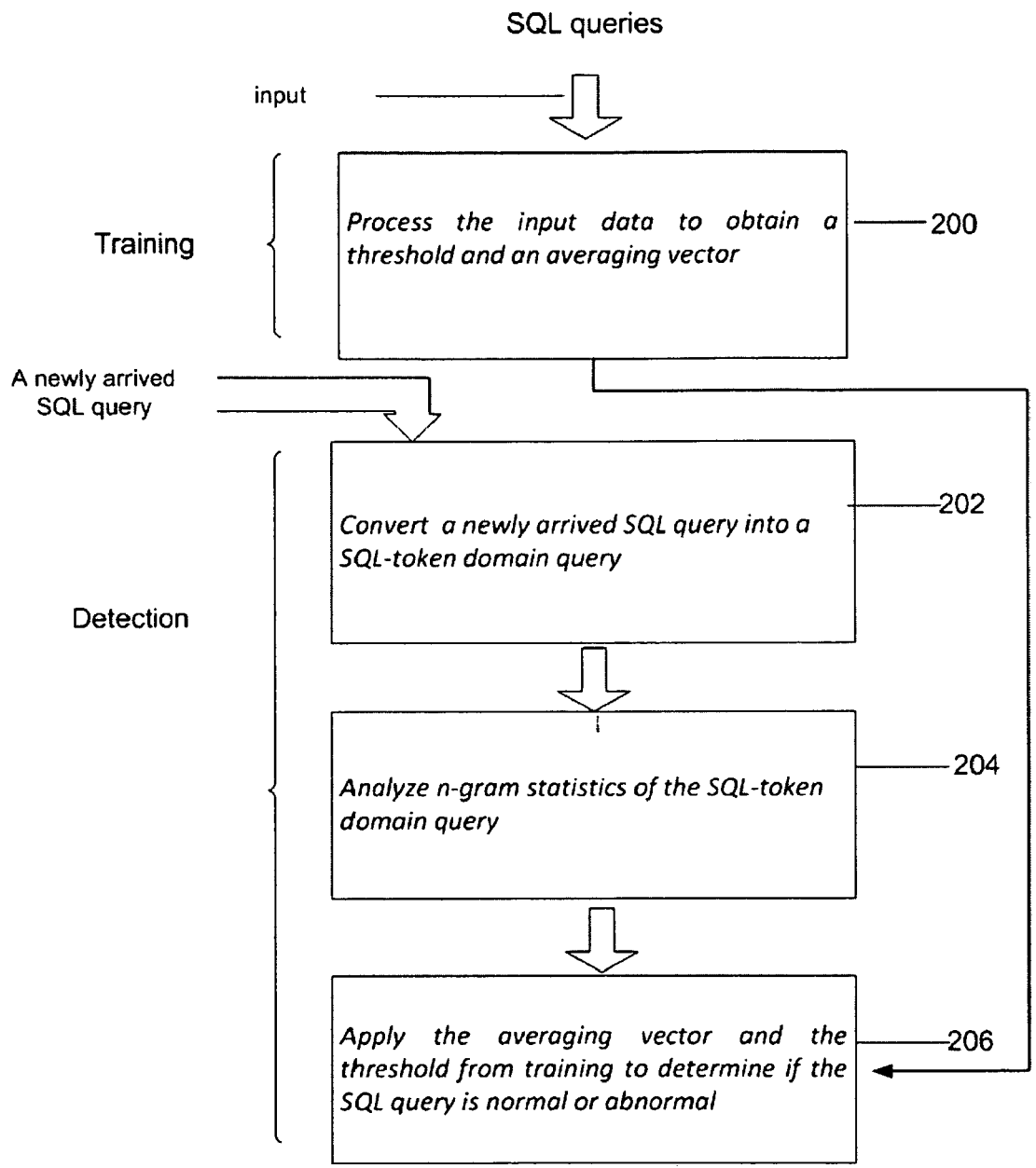
FIG. 2 is a flow chart of the main steps (training and detection) of the invention.

FIG. 2 shows a flow chart with the main steps of a method of the invention. Step 200 represents the offline training procedure. In this step, several SQL queries (also called "training data") are received and processed to provide a threshold and an averaging vector. Steps 202-206 represent the detection procedure (which can be offline or online). A newly arrived SQL query is transformed into a new SQL token domain query and its n-gram statistics are obtained in step 202. The n-gram statistics are analyzed in step 204. The newly arrived SQL query is classified as either normal or abnormal in step 206 based on the analysis of the n-gram statistics.

Figure 3:
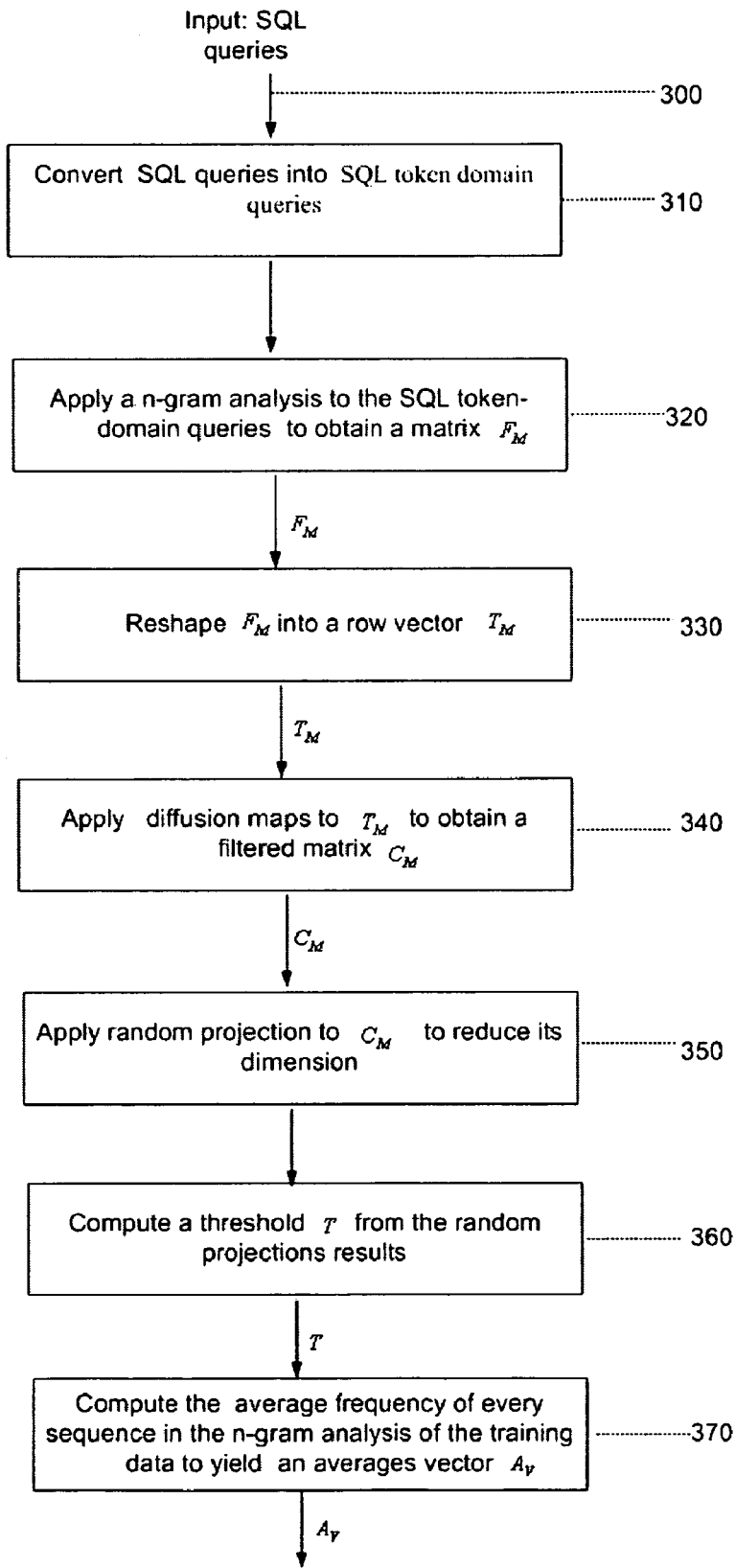
FIG. 3 is a flow chart showing details of the training phase in the method described in FIG. 2.

FIG. 3 is a flow chart showing more details of training step 200. In the training phase, the system analyzes training data offline, by extracting features from the data. The input SQL queries are converted into SQL token domain queries in step 310. Then, an n-gram analysis is applied to the SQL token domain queries in step 320. The n-gram analysis yields a large and sparse matrix (denoted by $F_M$) that includes an n-gram distribution of the tokens. Each $F_M$ matrix is reshaped into a row vector and in its entries are moved to another matrix (denoted by $T_M$) in step 330. The $T_M$ matrix may include elements that represent SQL injection attacks. To filter these attacks (if existing), we apply exemplarily a diffusion maps algorithm (R. R. Coifman and S. Lafon, "Diffusion maps", Applied and Computational Harmonic Analysis, 21(1), 5-30, 2006, hereinafter DM) to $T_M$ in step 340. The filtering of $T_M$ yields a filtered matrix denoted by $C_M$. The diffusion maps provide a "coarse" filtering of the training data. Next, the $C_M$ matrix row dimensionality is reduced by applying exemplarily a random projection in step 350. The dimensionality reduction by RP is done by calculating the inner products of a Gaussian random vector with each row in $C_M$. Each inner product produces a number. The maximum value among these numbers is a threshold T output in step 360. An averaging vector (denoted by $A_V$), which describes the average frequency of every sequence in the n-gram analysis of the training data, is computed in step 370. Thus, the outputs from the training phase are T and $A_V$.

Figure 4:
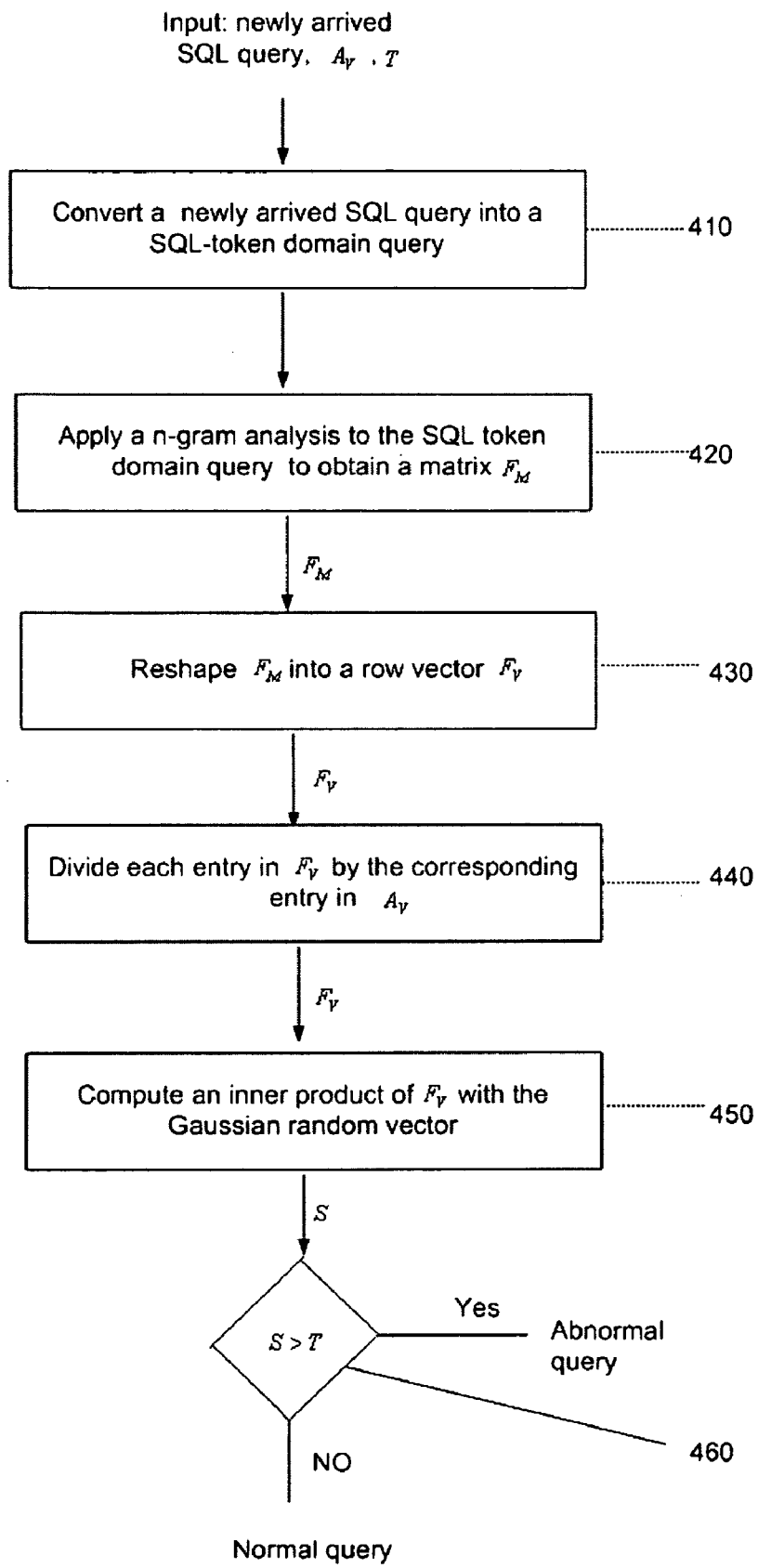
FIG. 4 is a flow chart showing details of the detection phase in the method described in FIG. 2.

In one embodiment, in the detection phase represented by the flow shown in FIG. 4, the SQL queries are processed upon their arrival (if the processing is in real time). In an alternative embodiment, the SQL queries are processed offline. The inputs to the detection phase are a newly arrived SQL query and T and $A_V$ from the training phase. Each newly arrived SQL query is transformed into a SQL token domain query in step 410. Then, an n-gram analysis is applied to this query, yielding matrix $F_M$ in step 420. $F_M$ is reshaped as a row vector (denoted by $F_V$) in step 430. Each entry in $F_V$ is divided by a corresponding entry in averaging vector $A_V$ in step 440 to obtain $F_V$. An inner product of $F_V$ with a Gaussian random vector is computed in step 450. The result is denoted by S. The newly arrived SQL query is classified as either normal or abnormal based on a comparison of S with T performed in step 460. If S>T, the SQL query is abnormal. Otherwise, it is normal.

Detailed Description of the Training and Detection Algorithms

Notation:
SQL query: q
SQL queries training set: $Q_{training} = \{q_1, \ldots, q_n\}$
SQL tokens alphabet: $\{\sigma_1, \ldots, \sigma_N\}$
SQL tokens pattern: $w = \sigma_1[\sigma_2, \ldots, \sigma_{N-1}]^*\sigma_N$
Number of elements in a set A is denoted by |A|
sql_token_modelfunc: A function which operates on a SQL query and produces its token representation
diffusion_maps_func: A function that operates on the training dataset and filters out its anomalies Algorithm 1 describes the training phase. To simplify the presentation, the pseudo-code of the algorithm is described only for n=2. The pseudo-code can be generalized to any n. In this invention, the algorithm was tested for n=2, ..., 12.

Algorithm 1: Training Phase—Model Construction
Input: $Q_{training}$ (step 300)

Output: T, $A_V$ (steps 360 and 370)
T = 0
$F_M$ (i,j) = 0, i,j = 1,..., N
for l = 1 to |$Q_{training}$| do
  w=sql_token_model($q_l$)    (step 310)
  for k = 1 to |w|−1 do
    for i,j = 1 to N do
      if w(k) = $\sigma_i$ and w(k + 1) = $\sigma_j$ then (step 320 where n = 2)
        $F_M$ (i,j) = $F_M$ (i,j) + 1
      end
    end
  end
end
$F_V = (F_M(1,1), \ldots, F_M(1,N), \ldots, F_M(i,1), \ldots, F_M(i,N), \ldots, F_M(N,N))$
$T_M(l,i) = F_V(i), i=1,\ldots,N^2$    (step 330)
l = l + 1
end $T_M$ is normalized row-wise and filtered from anomalies by application of diffusion maps—step 350. The filtered matrix is $C_M$. It includes m rows.
$R_V$ Randomize Gaussian vector at size of $N^2$
$A_V \leftarrow (i) = 0, j=1, \ldots, N^2$
for i=1 to m do
  $A_V(j) = A_V(j) + C_M(i,j), j=1, \ldots, N^2$
  $S = \Sigma_{j=1}^{N^2} C_M(i,j) \cdot R_V(j)$ (step 360)
  if S>T then
    T=S
  end
end $$A_V(j) = \frac{A_V(j)}{m}, j = 1, \ldots, N^2 \qquad \text{(step 370)}$$

end Algorithm 1

Algorithm 2 describes the detection phase. This phase includes the application of the SQL token model to a new query, n-gram analysis, application of the random projection method and the final classification.

Algorithm 2: Detection Phase
Input: T, $A_V$, q (step 400)
Output: classification of q (step 460)
$F_M(i,j) = 0, i, j = 1, \ldots, N$
w = sql_token_model ($q_1$) (step 410)
for k=1 to |w|−1 do
  for i, j =1 to N do
    if w(k)=$\sigma_i$ and w(k+1)=$\sigma_j$ then (step 420 where n=2)
      $F_M(i,j) = F_M(i,j) + 1$
    end
  end
end
$F_V = (F_M(1,1), \ldots, F_M(1,N), \ldots, F_M(i,1), \ldots, F_M(i,N), \ldots, F_M(N,1), \ldots, F_M(N,N))$ $$F_V(j) = \frac{F_V(i)}{A_V(i)}, i = 1, \ldots, N^2 \qquad \text{(step 430)}$$

$$S = \sum_{j=1}^{N^2} F_V(i) \cdot R_V(j) \qquad \text{(step 440)}$$

if S>T then (step 460)
   q is classified as abnormal
end
else
q is classified as normal
end
end Algorithm 2

EXPERIMENTAL RESULTS

Simulation Environment

In order to test the proposed algorithm, we built a physical network which simulates a typical network environment. The physical network included a client machine running a browser and a server machine running an environment which includes an HTTP server, a SQL database and a web site. In addition, it included four intrusion detection systems (IDS) connected in a row: two hardware appliances and two IDSs implemented in software. The simulation network was used for:

1. Simulation of HTTP queries between a user and a web application to evaluate our proposed algorithm and the other approaches;
2. Testing the validity and the performance of crafted SQL injection attacks.

Figure 5:
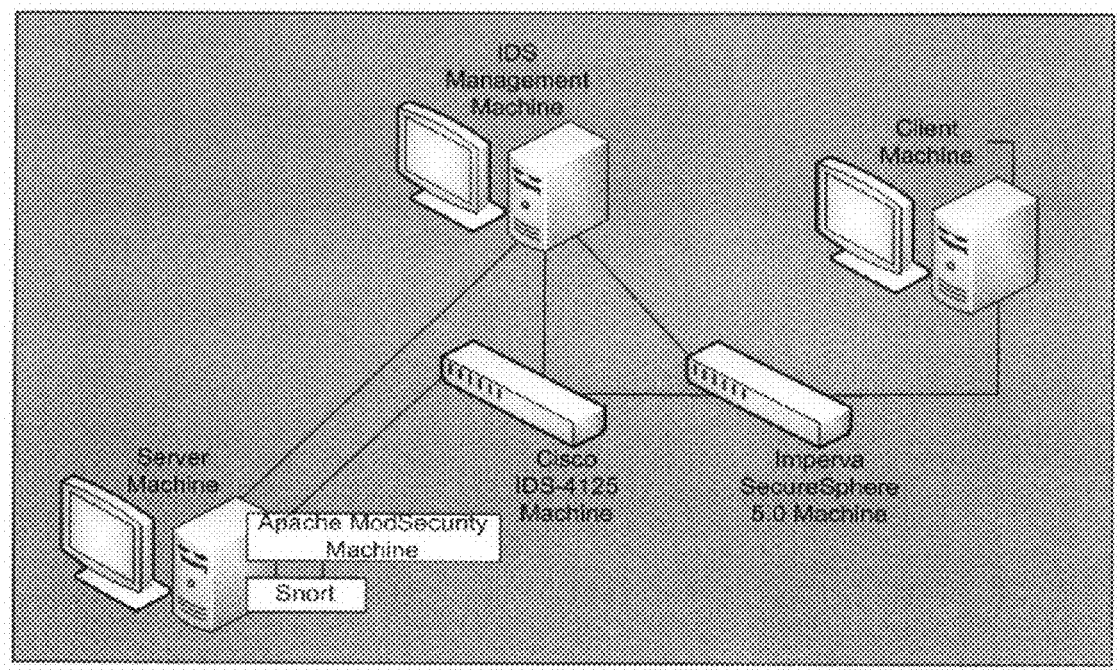
FIG. 5 displays the layout of the simulation environment.

FIG. 5 displays the layout of the simulation environment. The components in FIG. 5 are:

1. Client machine, which runs the SQL simulation engine. The client machine connects to a web site and sends an HTTP request to it. The HTTP request parameters are part of the user's input. They are used to construct the final SQL query.
2. Server machine, which is typical in a web site environment. This environment includes an Apache HTTP server (version 2.2.4) (The Apache Software Foundation, hereinafter APACHE), a MySQL server (version 5.0) and a PHP interpreter (version 5.2.3). Together, these three components form a working environment for establishing a web site that accesses a SQL database.
3. Imperva SecureSphere 5.0 machine: (hereinafter IMPERVA). This is a signature-based and anomaly-based IDS. It provides enterprise organizations with a unified protection against all critical attack vectors including web attacks, internal database breach and worms. According to its documentation, SecureSphere includes several protection layers to provide a complete protection suite. These layers include network firewall, signature-based intrusion prevention, protocol compliance mechanism, web worm mechanism, database firewall and more.
4. Cisco IDS-4125 machine: (see Cisco IDS 4215 Sensor, Cisco Systems Inc., hereinafter CISCO4215). This is the latest standalone appliance from Cisco. It is a signature and anomaly-based IDS. According to Cisco's documentation, it provides the best-in-class anomaly detection mechanism. It studies a normal behavior by learning the normal patterns of the traffic in a network, then alerts whenever it encounters a pattern which is not classified as normal and which is therefore considered to be malicious.
5. Apache ModSecurity: (hereinafter "AMS"). This is an open source web application firewall that runs as an Apache module. The goal of this tool is to increase security, detect and prevent attacks before they reach web applications. It is meant to provide protection from a range of attacks against web applications. It allows HTTP traffic monitoring and real time analysis.
6. SNORT: This is an open source signature-based intrusion detection and prevention system that is capable to perform traffic analysis of IP packets. According to its documentation, it can perform protocol analysis, content searching, detect several of attacks such as CGI attacks, buffer overflow attacks, SQL injection attacks and more. In our simulation network, the IMPERVA, CISCO4215, AMS and SNORT modules were configured to be in a passive mode, therefore not affecting the data that passing through.
7. Management Machine: The management machine is a standalone PC computer which connects to the management port of each of the mentioned IDSs. It it transparent for the entire network. It is used only for management purposes.

Figure 6:
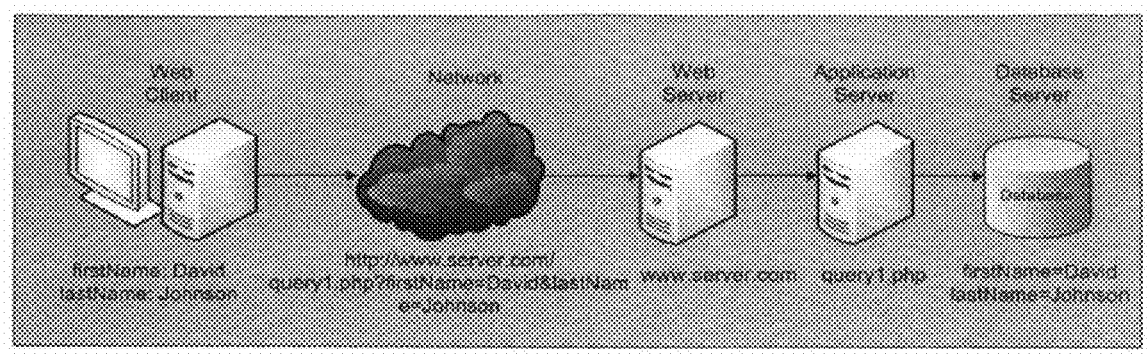
FIG. 6 displays the data flow between a user and a Web application.

FIG. 6 displays the data flow between a user and a Web application in the simulation network. It demonstrates the process which is initiated when a user surfs to a web site and ends when his request is served.

Client Machine

The client machine runs the SQL simulation engine. The engine was conceived and developed in order to provide a large variety of SQL queries. The simulator can operate in three different modes:

1. Normal Mode: The simulator generates only valid and safe SQL queries;
2. Attack Mode: The simulator generates only malicious SQL queries;
3. Mixed Mode: The simulator generates valid SQL queries that are joined by malicious SQL queries. The rate is determined by the user.
1. Normal mode: In this mode, the simulator generates HTTP queries which, when reaching the server machine, form a valid SQL query. The number of generated queries is determined by the user. The generated HTTP queries are divided into two different types, each resulting in a query targeted to a different SQL table. Each query type has its own unique parameters. The query type, number of parameters in the URL and their values are randomized by the simulator. This enables the retrieval of data from a database through different assorted queries. For example:
http://www.server.com/query1.php?body=img&
sender=bryan.reinecke@abc.com&mid=984
http://www.server.com/query1.php?firstName=Mike&
lastName=Anderson&Email_id=Mike.Anderson@
vsnet.com These HTTP queries are processed by the web server. They lead to retrieval of the requested data from tables Employeelist and Message. The tables' structure is discussed in detail in the section on the Server machine.

2. Attack mode: In this mode, the simulator randomly selects a malicious HTTP query from a predefined list of queries that were prepared in advance as part of this research. The number of generated queries is determined by the user. Each query includes tampered parameters which exploit a vulnerability in the SQL database. Once an attack is launched, the simulator gains unauthorized access to the database, which is reflected by an illegal extraction of a full database table. For example:

http://www.servermachine.com/
 query1.php?firstName=random&
 lastName='OR 1=1 OR 'a'='b This query launches an attack which results in the retrieval of the Employeelist table.

3. Mixed mode: This mode is a mixture of normal and attack modes. Queries from both operational modes are mixed together. The number of generated queries is determined by the user.

Server Machine

The server machine runs a full web site environment. This environment includes three components: Apache HTTP server, PHP application and MySQL server.

1. Apache HTTP server is a web server developed and maintained by an open source community of developers under the auspices of the Apache Software Foundation. The server is responsible for accepting HTTP requests from clients, then serving them with HTTP responses, which are mostly HTML documents. In our simulation, the server accepts valid and malicious URLs. They are processed by the PHP application;
2. PHP application is an important component in the communication process between a user and a web application. It runs the Apache HTTP server using the PHP interpreter module. It is responsible to retrieve URL parameters and to determine which table to access. In addition, it also constructs the SQL query, which will eventually be sent to the database. Insertion of tampered parameters may change the logic of a legitimate SQL statement. This can lead to a construction of a malicious query by the PHP application;
3. MySQL server holds the SQL database, which is used in our testing environment. This SQL database is a replica of The Enron Email SQL database (see Enron MySql Database hereinafter SQLENRON). This corpus was made public during a legal investigation conducted by the Federal Energy Commissions about irregular accounting procedures and frauds in Enron. The Enron dataset is a real benchmark. It includes mail correspondences of more than 250000 email traffic between Enron employees, where most of them were senior employees. In addition, it includes records of 151 specific employees. We used this data to perform normal and attack queries on it. Two tables with different structures are used. The MySQL database simulation tables are described in Table 5.

TABLE 5

| Employeelist table | | Message table | |
|---|---|---|---|
| Column name | Data type | Column name | Data type |
| Eid | INTEGER | Mid | INTEGER |
| firstName | VARCHAR | Sender | VARCHAR |
| lastName | VARCHAR | Date | DATETIME |
| email_id | VARCHAR | Messageid | VARCHAR |
| | | Subject | TEXT |
| | | Body | TEXT |
| | | Folder | VARCHAR |

SQL Injection Attack Flow

FIG. 7 displays a PHP code example. In our implementation, a user in a client machine is able to access services provided by the server machine and the residing database. When a user fills a web form, a URL is generated and sent to the web application. In our simulation, this application is PHP based. Then, several sequential steps take place:

1. A query template is designed (denoted by A);
2. The user's input is extracted from the HTTP request (denoted by B);
3. The user's input is used to create a dynamically generated query (denoted by C);
4. The query is sent to the database (denoted by D);
5. The response is used to generate an HTML page which is then sent back to the user (denoted by E).

For example, when a user fills a web form with the values David and Johnson for "firstName" and "lastName", respectively, then the following URL is generated:

http://www.server.com/
query1.php?firstName=David&lastName=Johnson.

Now, the application extracts the parameters from the HTTP request and embeds them in the query template. The following query is generated and sent to the database:

SELECT * from employeelist where firstName='David' and lastName='Johnson'

Exploitation of the site vulnerability is easily achieved by entering the string 'OR 'b'='b.

as parameter "lastName". The resulting query becomes:

SELECT * from employeelist where firstName='David' and lastName='OR 'b'='b'

The database interprets everything after the WHERE token as a logical condition. This condition in this case is evaluated to be TRUE. Therefore, the database returns all the information about all the users.

To verify the algorithm, we used three pairs of datasets. Each pair included two datasets: one for the training phase and the other for the detection phase. Each dataset was a list of SQL queries. These datasets originated from two different sources: one pair was generated by a SQL engine and the other two were recorded in academic network and they are called ASQL. Here is a brief overview of the different sources:

1. Simulation datasets: These datasets were generated by a SQL engine. This engine is capable of generating broad spectrum of SQL queries including various SQL commands, SQL keywords, logical conditions and more. In addition, this engine is capable to produce datasets which were infected with SQL injection attacks;
2. Academic network datasets (ASQL): The ASQL datasets are a collection of database activities from several days. The datasets were created by a web application which addresses a SQL database within the university network. The application provides an engine that searches for courses all over the campus. The service is available for every Internet user. The SQL queries were captured in the following way: Each database query was preceded by its logging. These accumulated queries form the datasets. Although the data was gathered from the same web application, the queries spectrum is diverse Our system for detection of SQL injection attacks was tested on the available datasets. Each test includes a training phase and a detection phase. We present the experimental results from the simulation datasets, the experimental results from the first ASQL datasets (denoted by ASQL-1) and the experimental results from the second ASQL datasets (denoted by ASQL-2).

Simulation Datasets

The simulation datasets were generated by the SQL engine.

Training set: This dataset was generated by the simulator using the 'Normal Mode' option. It included 100000 random SQL queries.

Testing set: This dataset was generated by the simulator using the 'Mixed Mode' option with one attack per 50 valid queries. 2000 queries were generated this way. The attacks were chosen randomly and were embedded into this set.

Figure 8A:
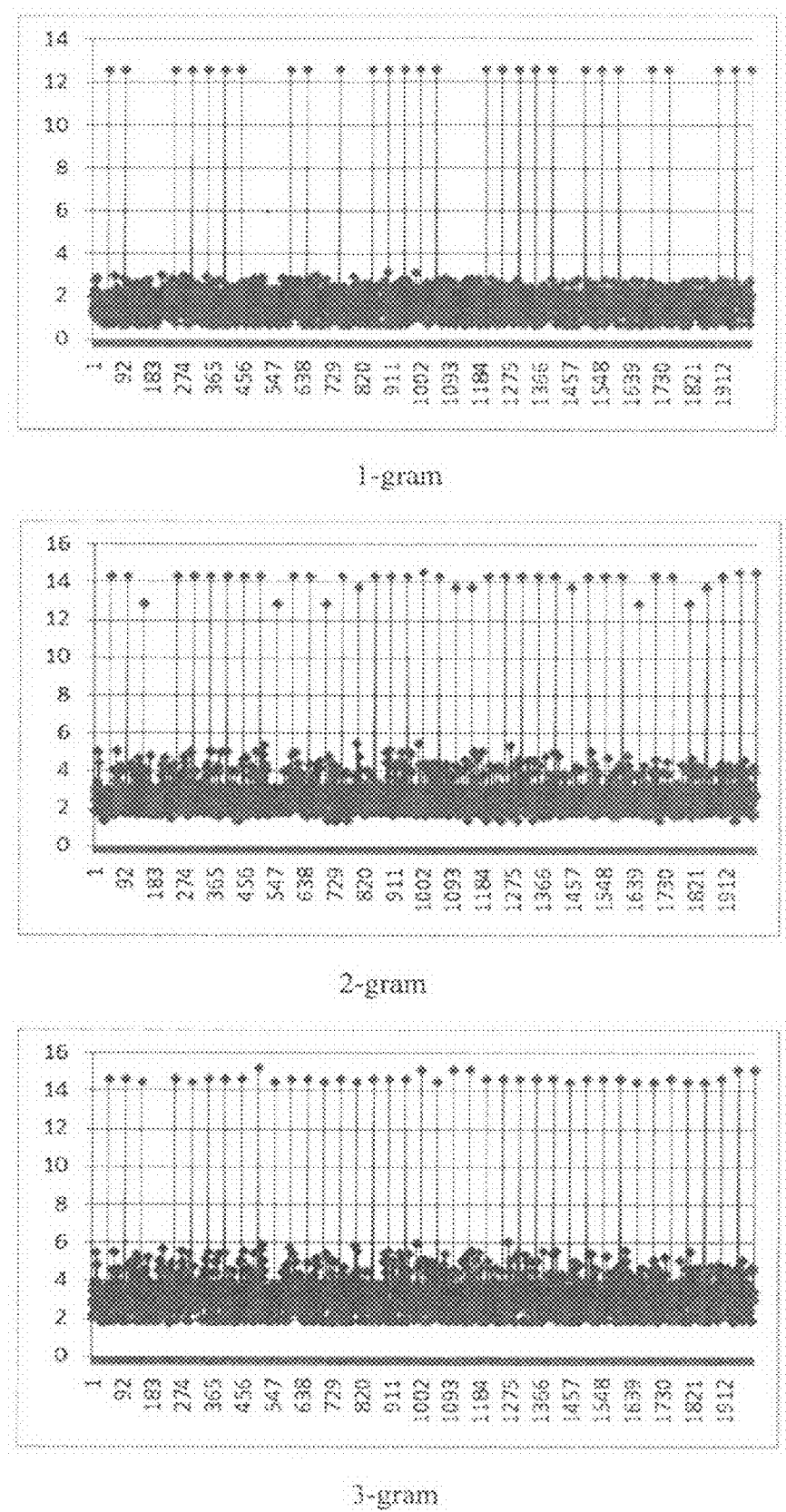
FIG. 8 displays the detection results of SQL injection attacks in simulated datasets with n=1, . . . , 6-gram analysis.
Figure 9A:
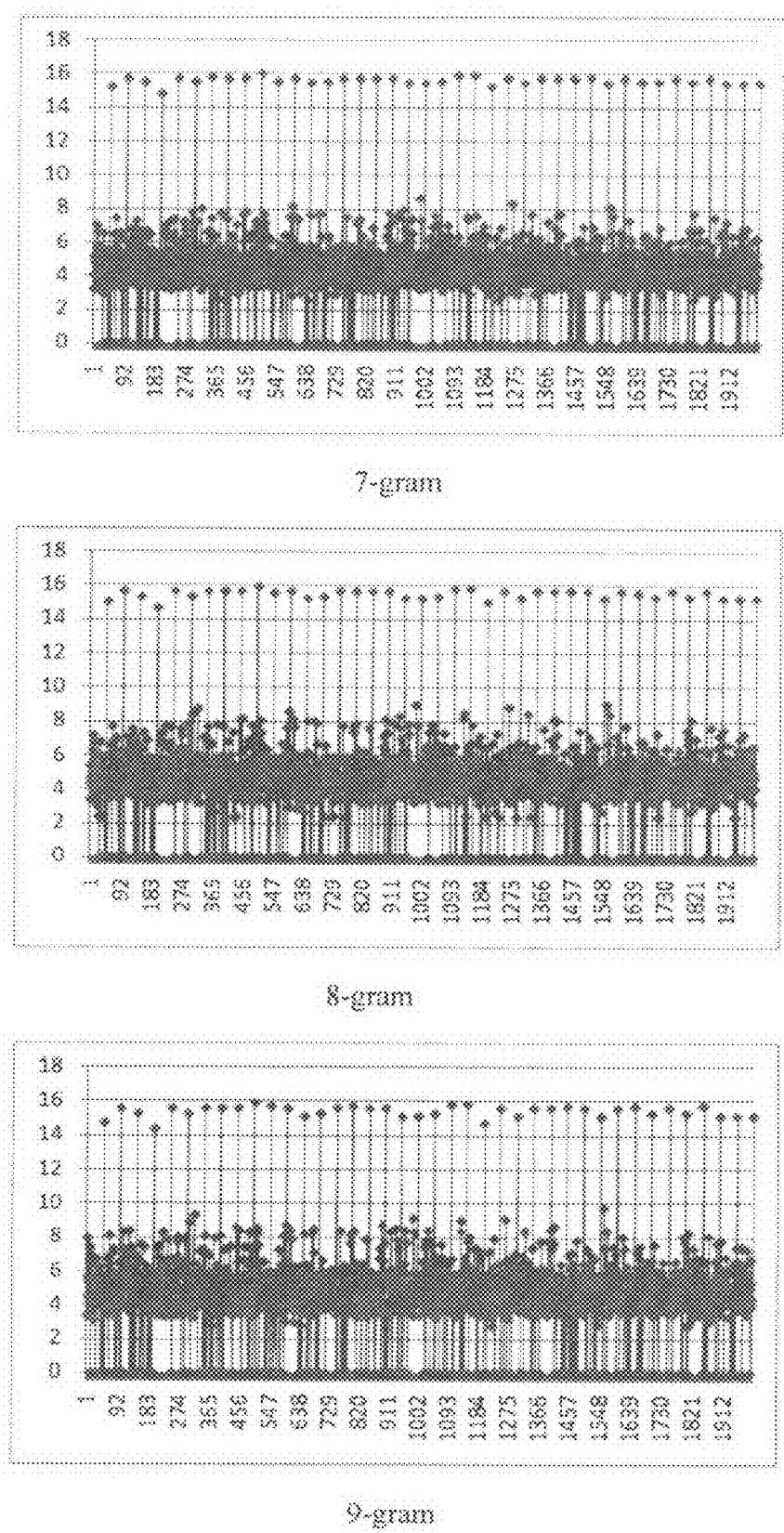
FIG. 9 displays the detection results of SQL injection attacks in simulated datasets with n=7, . . . , 12-gram analysis.
Figure 9B:
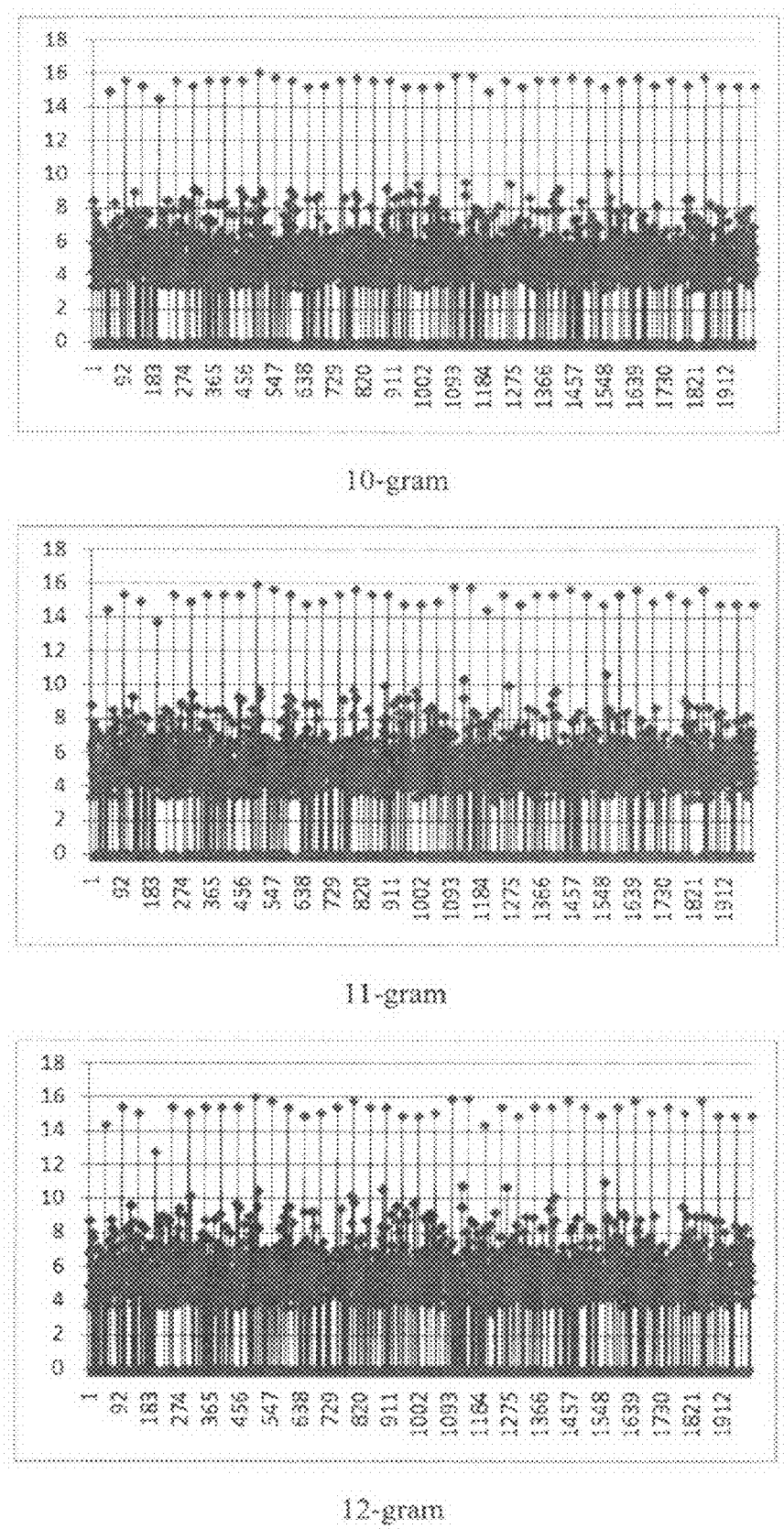

FIGS. 8 and 9 present the experimental results on the simulation datasets. Each graph describes the results for a different n-gram (y-axis). Each bar (x-axis) represents a score given to every SQL query. This score measures the anomaly level. Hence, the anomalies appear as the highest bars. Valid queries have lower height. FIG. 8 displays the detection results of SQL injection attacks in simulated datasets with n=1, . . . , 6-gram analysis. FIG. 9 displays the detection results of SQL injection attacks in simulated datasets with n=7, . . . , 12-gram analysis.

From these graphs, we see that our system achieved 100% of true detections for n=4, . . . , 9 with 0% of false positive and false negative detections. When n=1, 2, 3, then this technique does not produce any false positive detection while having some false negative detection. Starting from n=10, we get false positive detections. High values of n introduce noise to the detection process. Nevertheless, they do not produce any false negative detection. Table 6 summarizes the results from FIGS. 8 and 9.

TABLE 6

| Gram number | Total detections | False positive % | False negative % |
|---|---|---|---|
| 1 | 28 | 0 | 30 |
| 2 | 39 | 0 | 2.5 |
| 3 | 39 | 0 | 2.5 |
| 4 | 40 | 0 | 0 |
| 5 | 40 | 0 | 0 |
| 6 | 40 | 0 | 0 |
| 7 | 40 | 0 | 0 |
| 8 | 40 | 0 | 0 |
| 9 | 40 | 0 | 0 |
| 10 | 41 | 0.05 | 0 |
| 11 | 42 | 0.1 | 0 |
| 12 | 48 | 0.4 | 0 |

ASQL-1 Datasets

This capture started on 6 Jan. 2008 and ended on 8 Jan. 2008. More than 12000 queries were captured during this time. We used them as follows:
Training set: 10000 queries were used as the training set.
Testing set: 2000 queries were used as the testing set. In addition, we embedded several SQL injection attacks into it to make sure it undoubtedly included malicious queries.

Figure 10A:
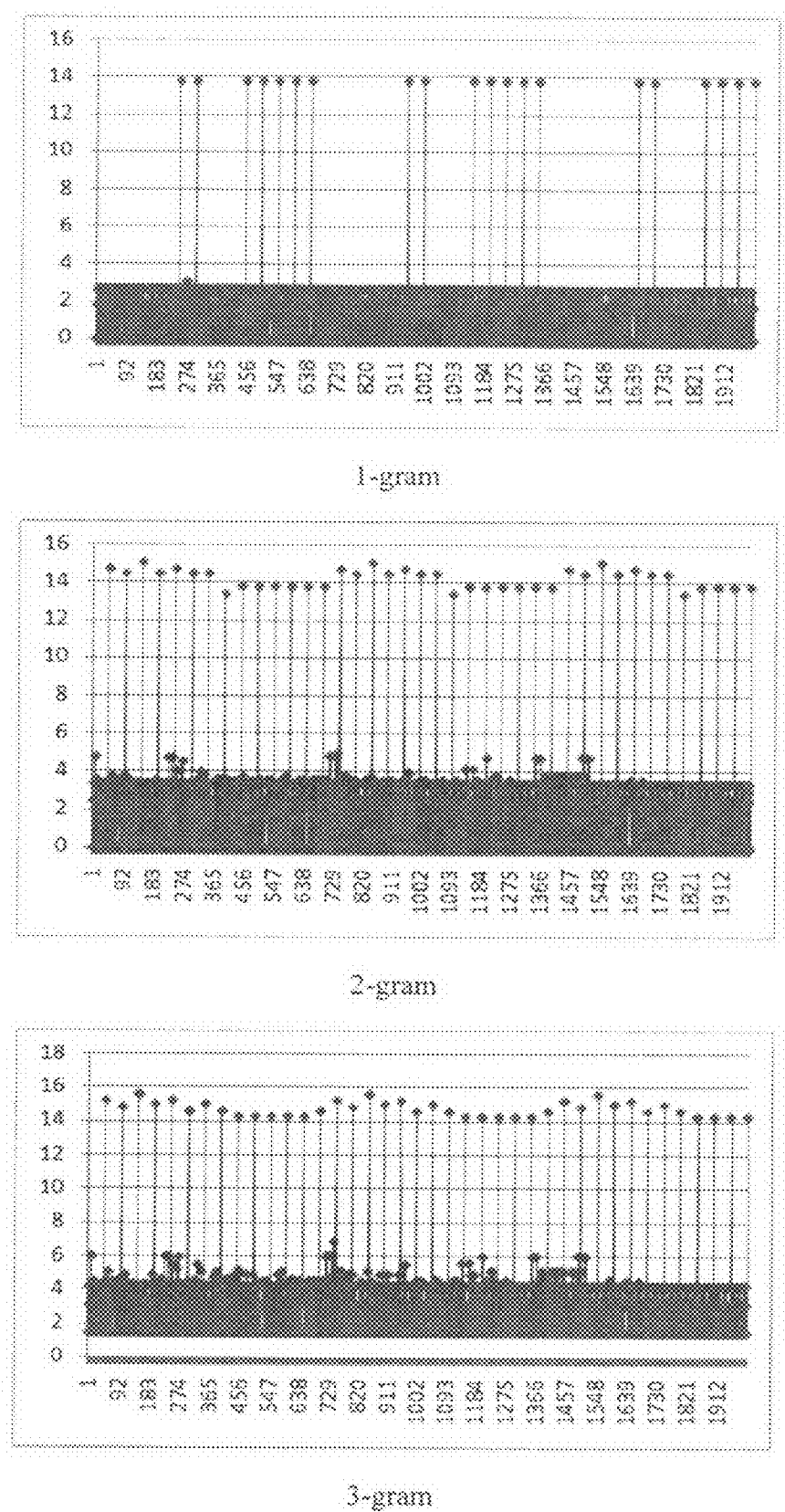
FIG. 10 displays the detection results of SQL injection attacks in ASQL-1 datasets with n=1, . . . , 6-gram analysis.
Figure 10B:
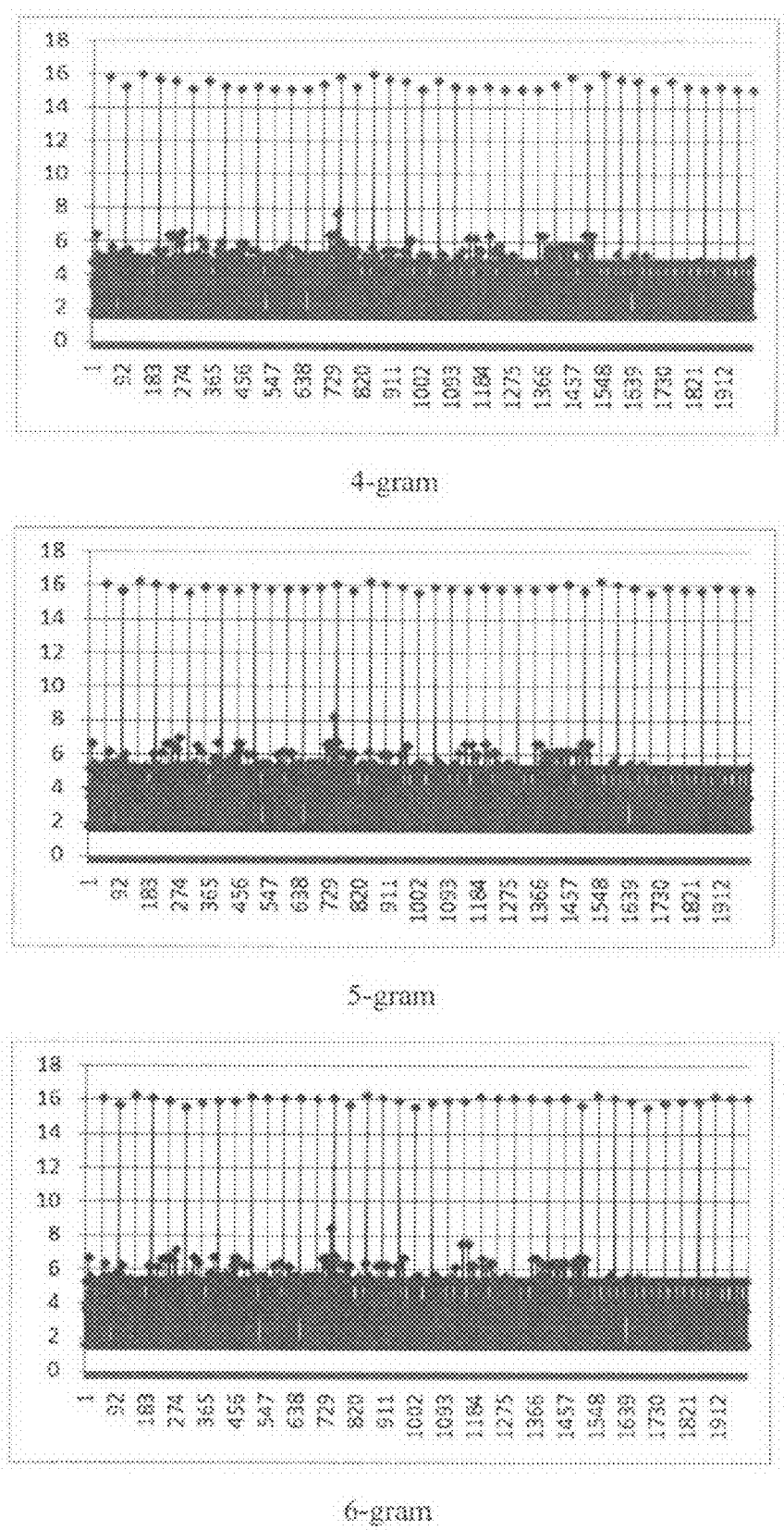
Figure 11A:
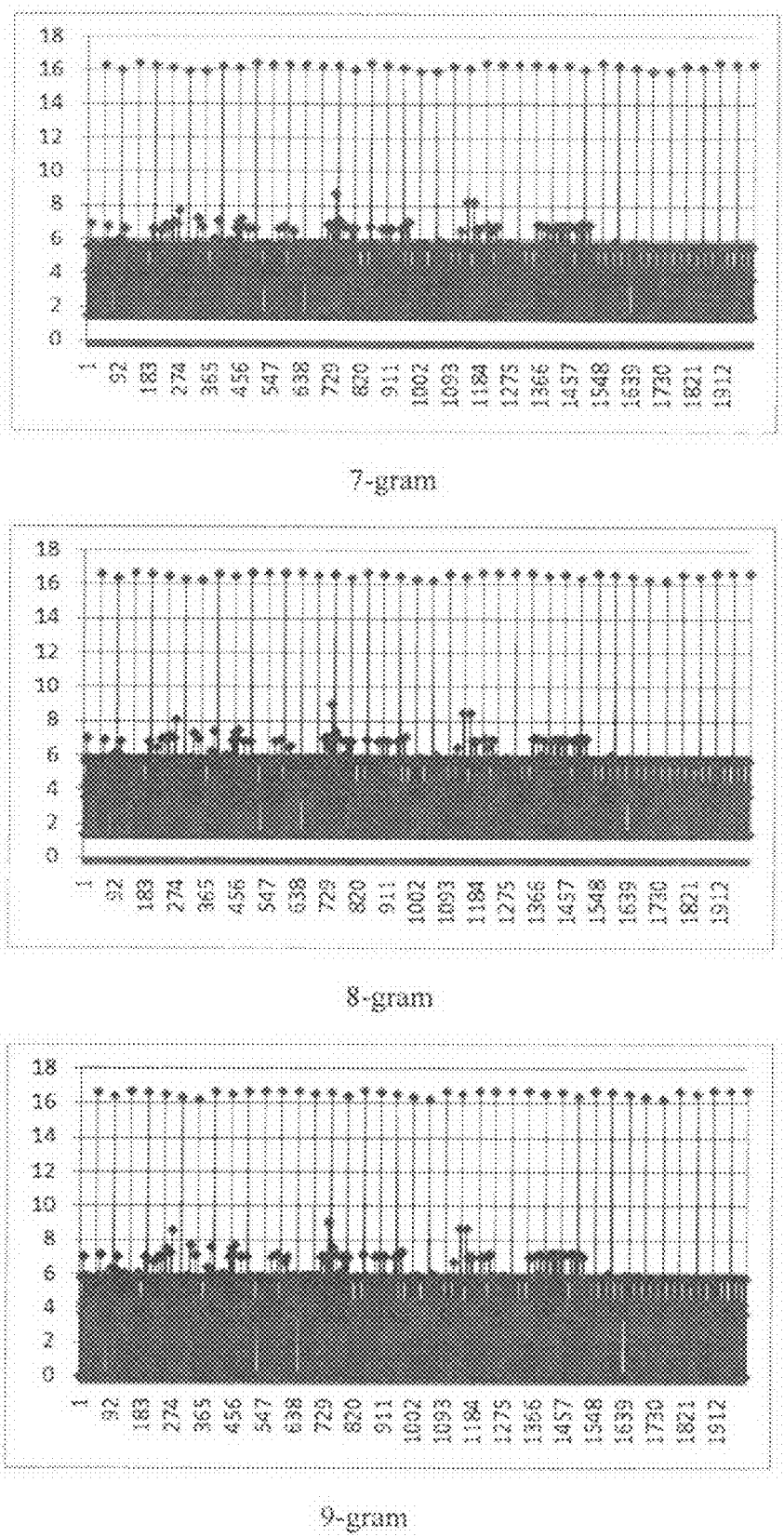
FIG. 11 displays the detection results of SQL injection attacks in ASQL-1 datasets with n=7, . . . , 12-gram analysis.
Figure 11B:
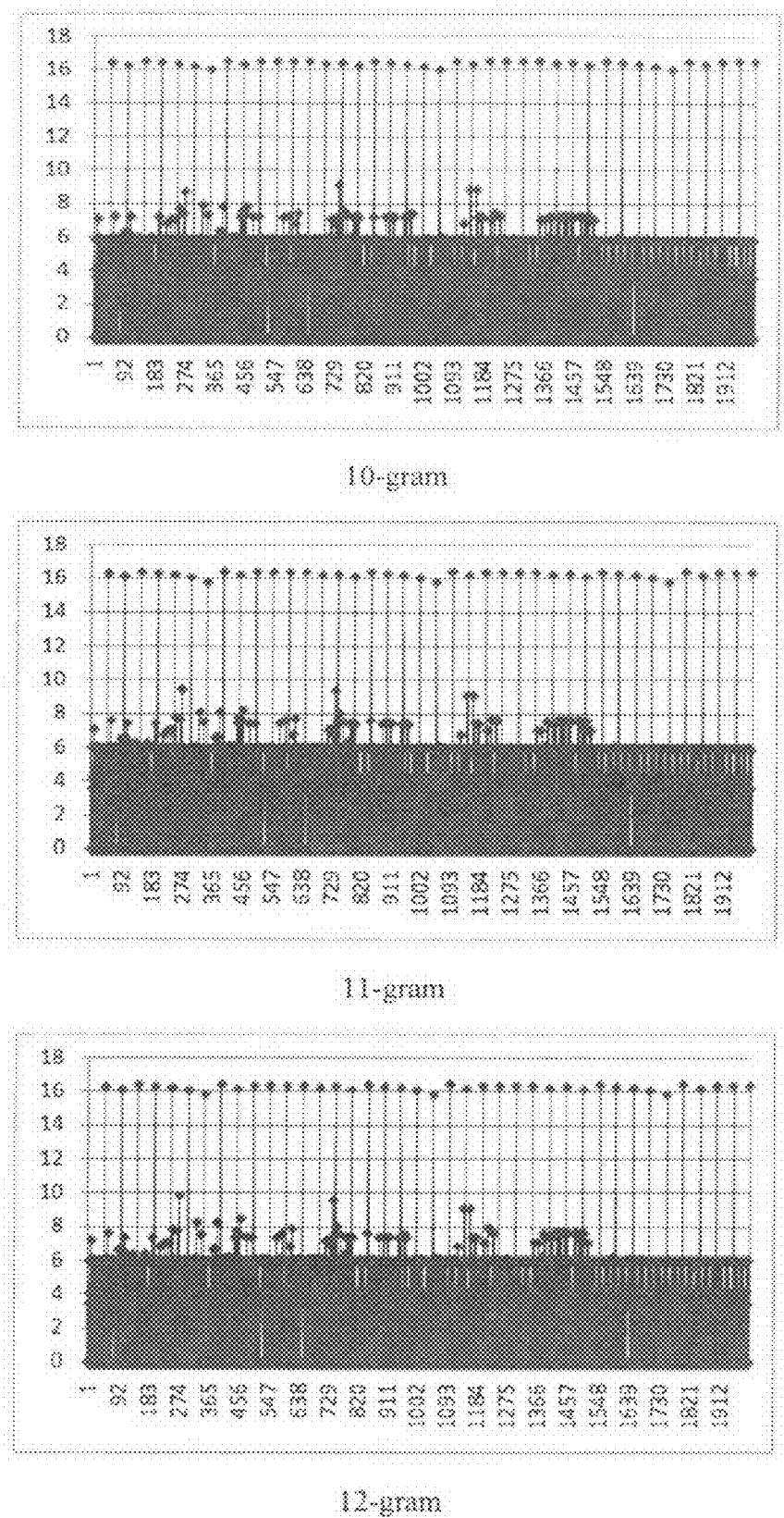

FIGS. 10 and 11 present the experimental results on the ASQL-1 datasets. Each graph describes the results for a different n-gram, where n=1, . . . , 12. FIG. 10 displays the detection results of SQL injection attacks in ASQL-1 datasets with n=1, . . . , 6-gram analysis. FIG. 11 displays the detection results of SQL injection attacks in ASQL-1 datasets with n=7, . . . , 12-gram analysis. As in FIGS. 8 and 9, each bar represents a score given to every SQL query. From these graphs, we see that our system achieved 100% of true detections for n=2, 3 with 0% of false positive and false negative detections. Starting from n=4, we get nearly perfect results: no false negative detections and only one false positive detection. This is due to the fact that the training set was extremely small. Since one specific query included a rare sequence, which was not encountered during the processing of the training set, it was detected as an anomaly. Nevertheless, no false negative detections were made. For n=1, this technique does not show any false positive detections, but it does have some false negative detections since sequences of only one token ignore much of the statistical information about tokens adjacency and their mutual relations.

Table 7 summarizes the results from FIGS. 10 and 11.

TABLE 7

| Gram number | Total detections | False positive % | False negative % |
|---|---|---|---|
| 1 | 20 | 0 | 50 |
| 2 | 40 | 0 | 0 |
| 3 | 40 | 0 | 0 |
| 4 | 41 | 0.05 | 0 |
| 5 | 41 | 0.05 | 0 |
| 6 | 41 | 0.05 | 0 |
| 7 | 41 | 0.05 | 0 |
| 8 | 41 | 0.05 | 0 |
| 9 | 41 | 0.05 | 0 |
| 10 | 41 | 0.05 | 0 |
| 11 | 41 | 0.05 | 0 |
| 12 | 41 | 0.05 | 0 |

ASQL-2 Datasets

This capture started on 10 Jan. 2008 and ended on 21 Jan. 2008. More than 147,000 queries were captured during this time. We used them as follows:

Training set: 145000 queries were used as the training set.
Testing set: 2000 queries were used as the testing set. In addition, we embedded several SQL injection attacks into it to make sure it undoubtedly included malicious queries.

Figure 12A:
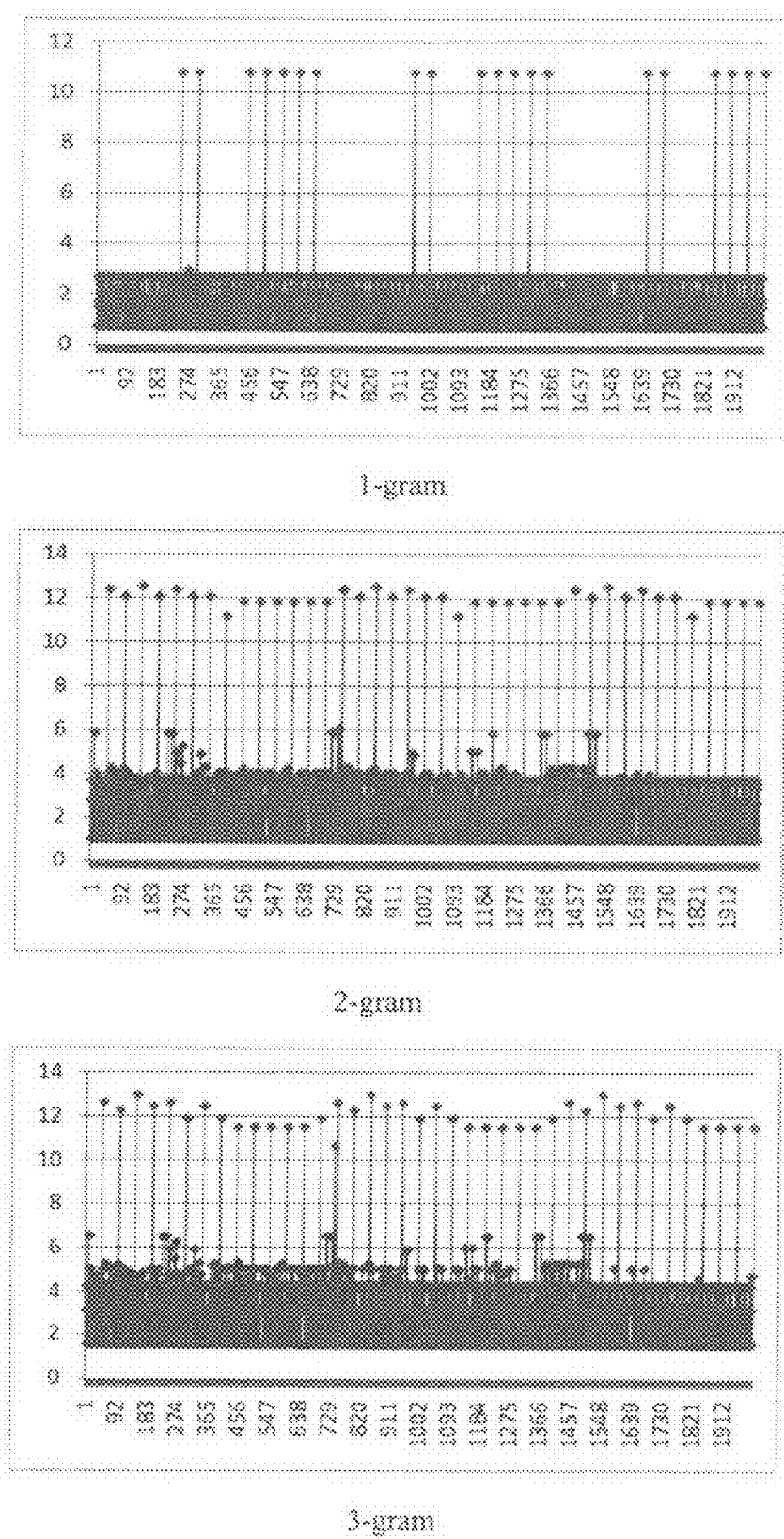
FIG. 12 displays the detection results of SQL injection attacks in ASQL-2 datasets with n=1, . . . , 6-gram analysis.
Figure 12B:
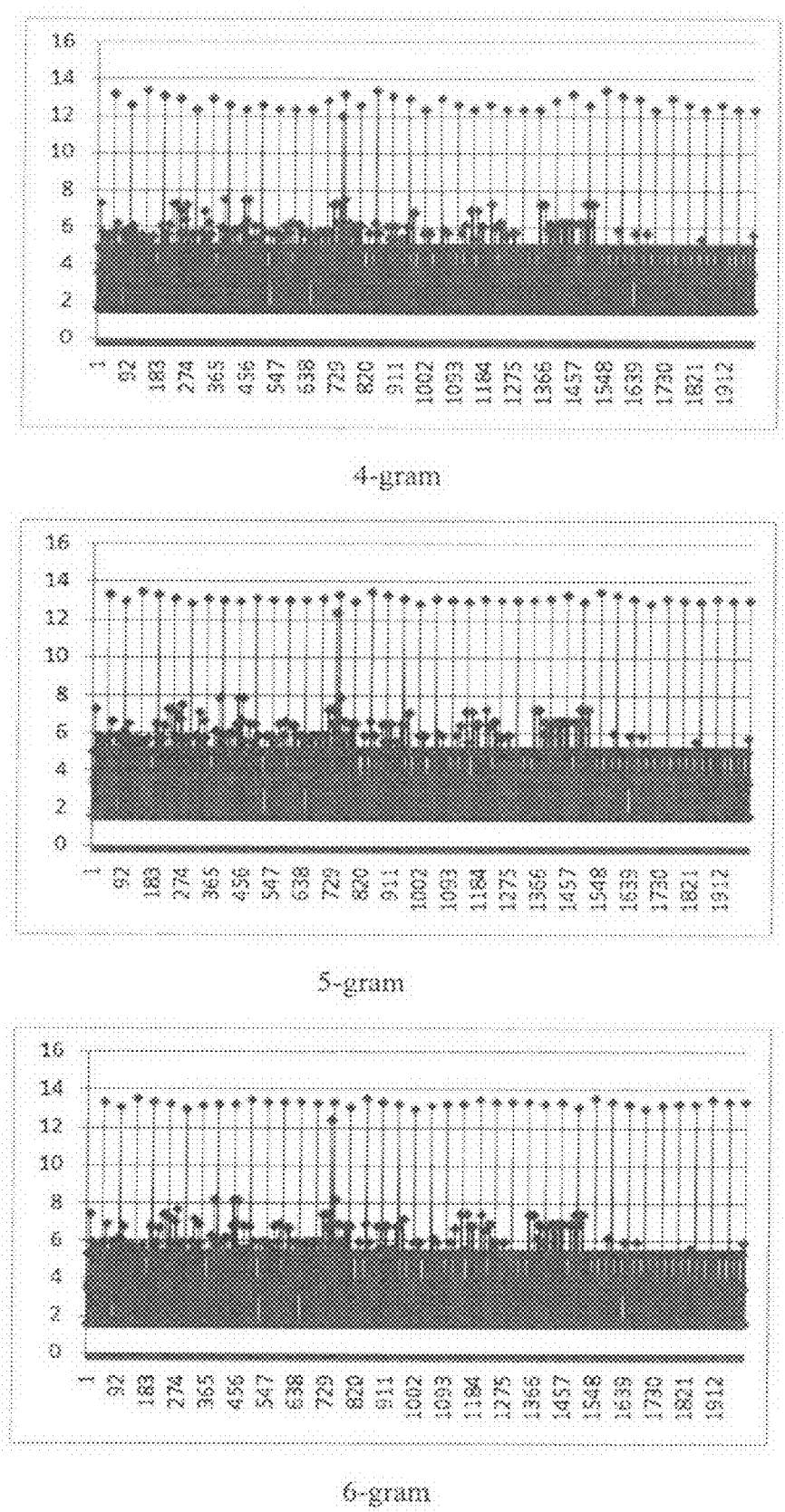
Figure 13A:
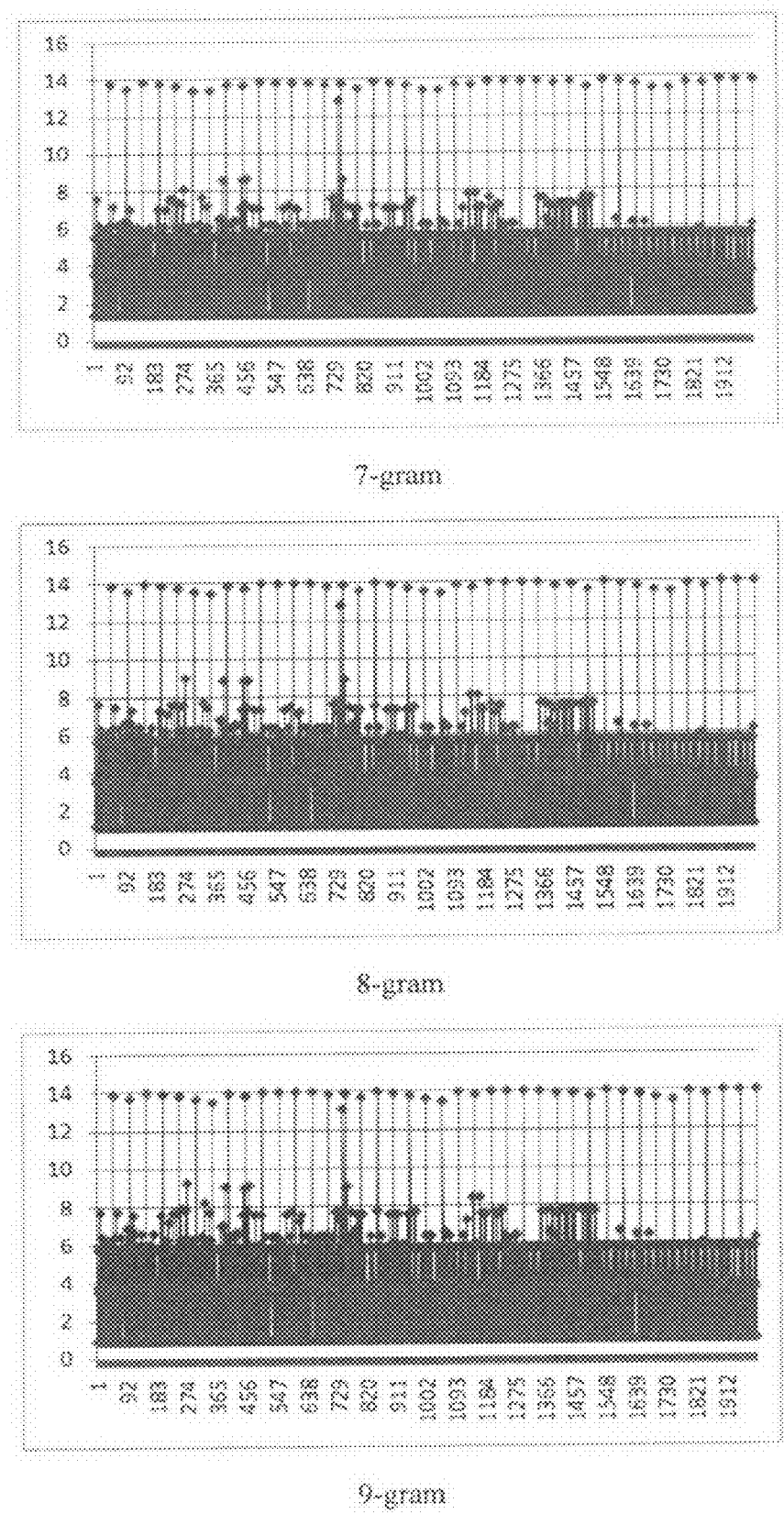
FIG. 13 displays the detection results of SQL injection attacks in ASQL-2 datasets with n=7, . . . , 12-gram analysis.
Figure 13B:
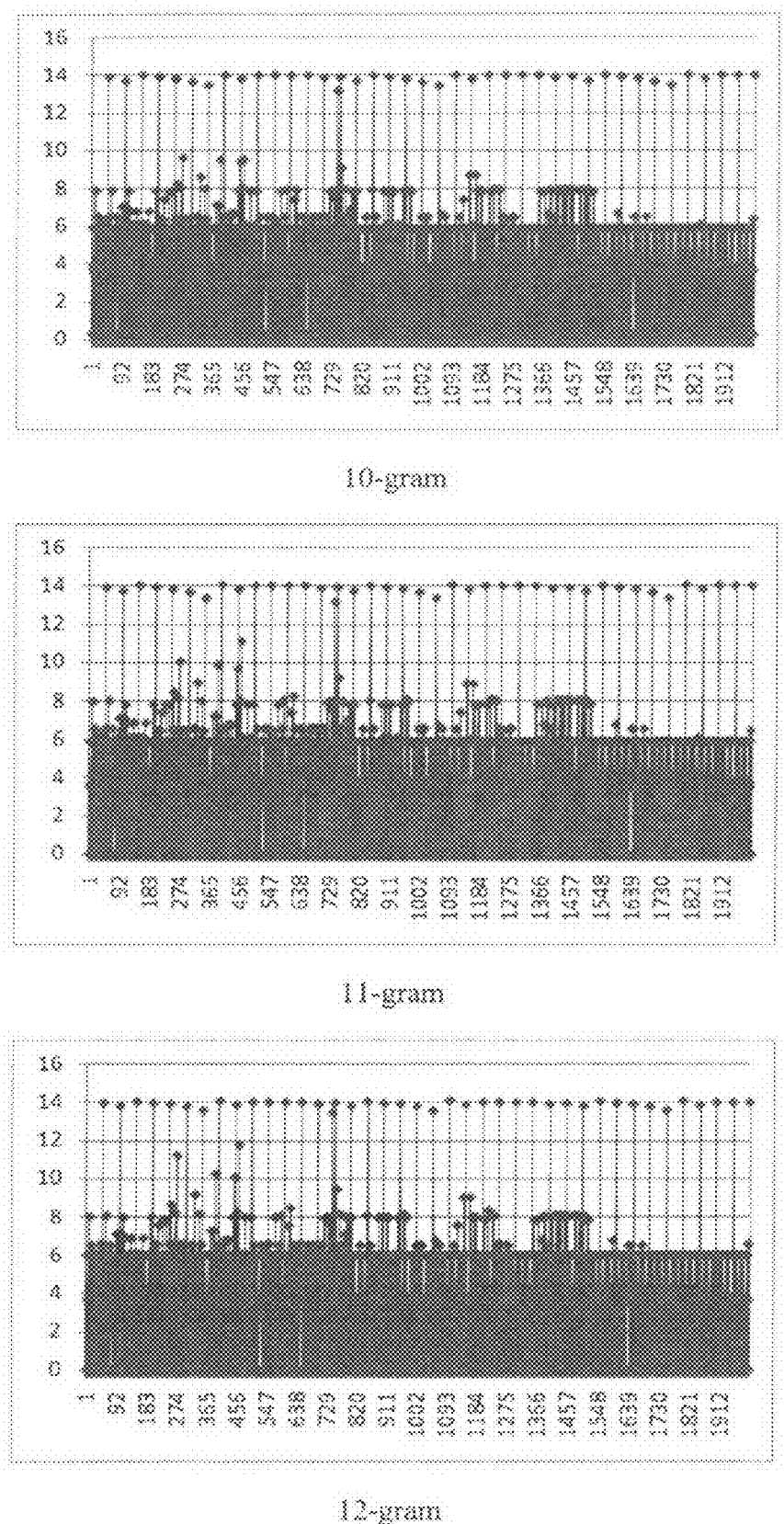

FIGS. 12 and 13 present the experimental results on the ASQL-2 datasets. Each graph describes the results for a different n-gram, where n=1, . . . , 12. FIG. 12 displays the detection results of SQL injection attacks in ASQL-2 datasets with n=1, . . . , 6-gram analysis. FIG. 13 displays the detection results of SQL injection attacks in ASQL-2 datasets with n=7, . . . , 12-gram analysis. As in FIGS. 8 and 9, each bar represents a score given to every SQL query. From these graphs, we see that our system achieved 100% of true detections for n=2, . . . , 12. All the attacks were detected. There were no false positives. This is due to the fact that using a large training set yields better and more accurate behavior learning.

Table 8 summarizes the results of FIGS. 12 and 13:

TABLE 8

| Gram number | Total detections | False positive % | False negative % |
|---|---|---|---|
| 1 | 20 | 0 | 50 |
| 2 | 40 | 0 | 0 |
| 3 | 40 | 0 | 0 |
| 4 | 40 | 0 | 0 |
| 5 | 40 | 0 | 0 |
| 6 | 40 | 0 | 0 |
| 7 | 40 | 0 | 0 |
| 8 | 40 | 0 | 0 |
| 9 | 40 | 0 | 0 |
| 10 | 40 | 0 | 0 |
| 11 | 40 | 0 | 0 |
| 12 | 40 | 0 | 0 |

Summary of Experimental Results

The algorithm with n=3, . . . , 9 produces the best results. In the first experiment, n=4, . . . , 9 produce 100% of success, having neither false positive nor false negative detections. In the second experiment, n=2, 3 produce the best results, where n=4, . . . , 12 yield only one false positive detection. This can be attributed to the small size of the training set which was extremely small. Except this, the results are close to perfect. In the third experiment, n=2, . . . , 12 produce 100% success, having neither false positive nor false negative detections.

Comparison to Cisco IDS-4125

The testing procedure includes the following steps:
1. Training: The training set was generated by the SQL simulation engine. It included 4000 valid queries.
2. Detection: The testing set included 14 different attack queries. They were based on the examples presented in the section on 'SQL injection attack examples' with minor changes. In addition, the testing set included 14 valid queries.

Only 2 of the 14 (15%) attacks were detected by CISCO4215. The attacks were detected by the signature-based engine due to the existence of suitable signatures in the IDS database. No attacks were detected by the anomaly detection engine in CISCO4215. There were no false positives detections.

Comparison to Imperva SecureSphere 5.0

The test included the following phases:
1. Training: The training set was generated by the SQL simulation engine. It included 300 valid queries.
2. Detection: The testing set included 14 different attack queries. They were based on the examples presented in the section on 'SQL injection attack examples' with minor changes. In addition, the testing set included 14 valid queries.

During the training phase, Imperva builds a profile that describes the training set. This profile includes parameter name, type, length and more. The results showed that only 5 of the 14 (36%) attacks were detected by Imperva SecureSphere 5.0. The attacks were detected by the signature-based engine due to the existence of suitable signatures in the IDS database. No attacks were detected by the anomaly detection engine in Imperva since they satisfied this profile. In addition, there were no false positive detections.

Comparison to SNORT and AMS

The test included only a dataset with 14 different attack queries. They were based on the examples presented in the section on 'SQL injection attacks examples' with minor changes. Since these IDSs are signature-based, there is no use of a training phase. The results show that AMS detected 9 of the 14 (65%) attacks, whereas SNORT failed to detect any attack.

Comparison Summary

A summary of the above comparisons between systems that detect SQL injection attacks is given in Table 9:

TABLE 9

| Machine/Algorithm | Success in % |
|---|---|
| SNORT | 0 |
| AMS | 65 |
| CISCO4215 | 15 |
| IMPERVA | 36 |
| This invention | 100 |

As seen, the four known solutions (SNORT, AMS, CISCO4215 and Imperva) had only limited to none success in the detection of SQL injection attacks. None of the four known solutions detected all the attacks. Thus, the systems protected by these solutions remain unsecured and vulnerable.

Tables 10 and 11 provide a full overview of the comparisons among the tested systems. The markings mean the following: S=SNORT, A=AMS, C=CISCO4215, I=IMPERVA, T=this invention, X=Failure, V=Success. The tests were conducted using the PHP application described in FIG. 6. The following queries, except the last one, are based upon the template:

SELECT * FROM employeelist WHERE firstName='".$firstName."' AND lastName='".$lastName."'

TABLE 10

| Parameters and resulting query | S | A | C | I | T |
|---|---|---|---|---|---|
| firstName=' UNION SELECT * from employeelist# lastName=some_ string WHERE firstName='' UNION SELECT * from employeelist#'and lastName='some_string' | X | V | V | V | V |
| firstName=' or 1=1# lastName=some_string WHERE firstName='' or 1=1\#'and lastName='some_string' | X | V | X | V | V |
| firstName=some_string lastName=' or 'b'='b WHERE firstName='some string'and lastName='' or 'b'='b' | X | V | X | X | V |
| firstName=some_string lastName=' or 2=2 or 'c'='d WHERE firstName='some_string' and lastName='' or 2=2 or 'c'='d' | X | V | X | X | V |
| firstName=' or 1# lastName=some_string WHERE firstName='' or 1#' and lastName='some_string' | X | X | X | X | V |
| firstName=some_string lastName=' or 1 or 'a'='b WHERE firstName='some_string' and lastName='' or 1 or 'a'='b' | X | V | X | X | V |

TABLE 11

| Parameters and resulting query | S | A | C | I | T |
|---|---|---|---|---|---|
| firstName=some_string lastName=' or 1 or lastName='b WHERE firstName='some_string' and lastName='' or 1 or lastName='b' | X | X | X | X | V |
| firstName='; DROP table new_table# LastName=some_string WHERE firstName=''; DROP table new_table#' and lastName='some_string' | X | V | X | V | V |
| firstName='; CREATE table new_table(size int)\# lastName=some_string WHERE firstName=''; CREATE table new_table(size int) #' and lastName='some_string' | X | X | X | V | V |
| firstName='; INSERT into table new_table values (5)-- lastName=some_string WHERE firstName=''; INSERT into new_score table values (5) --' lastName='some_string' | X | V | V | X | V |
| firstName='; INSERT into table new_table values(5)-- lastName=some_string WHERE firstName=''; INSERT into new_table values(5) --' lastName='some_string' | X | V | X | X | V |
| firstName='; INSERT into table new_table values(5) # lastName=some_string WHERE firstName=''; INSERT into new_table values(5) #' lastName='some_string' | X | V | X | X | V |

TABLE 11-continued

| Parameters and resulting query | S | A | C | I | T |
|---|---|---|---|---|---|
| firstName='; WAITFOR delay '0:0:10'# lastName=some_string WHERE firstName=''; WAITFOR delay '0:0:10'#' and lastName='some_string' | X | X | X | V | V |
| eid=1 or 1 WHERE eid=1 or 1 | X | X | X | X | V |

As seen from Tables 10 and 11, neither the known anomaly-based IDSs nor the signature-based IDSs had satisfactory performance in detecting SQL injection attacks. Detection percentage varies from very low (SNORT) to Medium (AMS). The signature-based IDSs succeeded in detecting attacks which matched existing signatures in their signatures database. New attacks or old ones with minor changes in them could not be detected this way. The anomaly-based IDSs did not succeed either. Despite the fact that a profile was dynamically established, the system could not identify anomalous behaviors. The signature-based mechanism succeeded partially.

In summary, the invention disclosed herein delivers complete success in identifying all the SQL injection attacks by using the described approach for anomaly-based detection.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein. For example, any digital computer system can be configured or otherwise programmed to implement the methods disclosed herein, and to the extent that a particular digital computer system is configured to implement the methods of this invention, it is within the scope and spirit of the present invention. Once a digital computer system is programmed to perform particular functions pursuant to computer-executable instructions from program software that implements the present invention, it in effect becomes a special purpose computer particular to the present invention. The techniques necessary to achieve this are well known to those skilled in the art and thus are not further described herein.

Computer executable instructions implementing the methods and techniques of the present invention can be distributed to users on a computer-readable medium and are often copied onto a hard disk or other storage medium. When such a program of instructions is to be executed, it is usually loaded into the random access memory of the computer, thereby configuring the computer to act in accordance with the techniques disclosed herein. All these operations are well known to those skilled in the art and thus are not further described herein. The term "computer-readable medium" encompasses distribution media, intermediate storage media, execution memory of a computer, and any other medium or device capable of storing for later reading by a computer a computer program implementing the present invention.

Accordingly, drawings, tables, and description disclosed herein illustrate technologies related to the invention, show examples of the invention, and provide examples of using the invention and are not to be construed as limiting the present invention. Known methods, techniques, or systems may be discussed without giving details, so to avoid obscuring the principles of the invention. As it will be appreciated by one of ordinary skill in the art, the present invention can be implemented, modified, or otherwise altered without departing from the principles and spirit of the present invention. Therefore, the scope of the present invention should be determined by the following claims and their legal equivalents.

All patents, patent applications and publications mentioned in this specification are herein incorporated in their entirety by reference into the specification, to the same extent as if each individual patent, patent application or publication was specifically and individually indicated to be incorporated herein by reference. In addition, citation or identification of any reference in this application shall not be construed as an admission that such reference is available as prior art to the present invention.

The invention claimed is:

1. A method for detecting a structured query language (SQL) injection attack, the method performed by a computer executing computer-readable code embodied on a computer-readable storage device, the method comprising the steps of:
   a) transforming, by the computer, a new SQL query into a new SQL token domain query; and
   b) applying a n-gram analysis together with a threshold and an averaging vector to the new SQL token domain query to determine whether or not the SQL query is an injection attack query, wherein the applying the n-gram analysis together with threshold and averaging vector includes:
      i. obtaining a filtered matrix,
      ii. reshaping the filtered matrix as a row vector,
      iii. dividing each entry in the row vector by a corresponding entry in the averaging vector to obtain a new vector,
      iv. calculating an inner product of the new vector with a random vector to obtain a result, and
      v. comparing the result with the threshold.

2. The method of claim 1, wherein the steps of transforming a new SQL query into a new SQL token domain query and applying a n-gram analysis together with a threshold and an averaging vector to the new SQL token domain query are preceded by the steps of:
   c) transforming a plurality of SQL queries into respective SQL token domain queries; and
   d) applying a n-gram analysis to the SQL token domain queries to obtain the threshold and the averaging vector.

3. The method of claim 1, wherein the step of transforming the new SQL query into a new SQL token domain query and the step of applying a n-gram analysis together with a threshold and an averaging vector to the new SQL token domain query are performed online in real time.

4. The method of claim 2, wherein the steps of transforming a plurality of SQL queries into respective SQL token domain queries and the step of applying a n-gram analysis to the SQL token domain queries are performed offline.

5. The method of claim 2, wherein the steps of transforming the plurality of SQL queries and the new SQL query into SQL token domain queries includes searching each symbol of a SQL query for a respective associated token and replacing each symbol with its respective associated token.

6. The method of claim 1, wherein the obtaining a filtered matrix includes obtaining the filtered matrix by applying diffusion maps to a matrix derived from the n-gram analysis.

7. The method of claim 1, wherein the random vector is a Gaussian random vector.

8. A computer-readable storage device having computer readable code embodied therein, the computer-readable code used for detecting a structured query language (SQL) injection attack and comprising:
- a) program code for transforming a new SQL query into a new SQL token domain query; and
- b) program code for applying a n-gram analysis together with a threshold and an averaging vector to the new SQL token domain query to determine whether or not the SQL query is an injection attack query, wherein the applying the n-gram analysis together with a threshold and an averaging vector includes:
    - i. obtaining a filtered matrix,
    - ii. reshaping the filtered matrix as a row vector,
    - iii. dividing each entry in the row vector by a corresponding entry in the averaging vector to obtain a new vector,
    - iv. calculating an inner product of the new vector with a random vector to obtain a result, and
    - v. comparing the result with the threshold.

9. The computer-readable storage device of claim 8, wherein the computer-readable code further comprises:
- c) program code for transforming a plurality of SQL queries into respective SQL token domain queries; and
- d) program code for applying a n-gram analysis to the SQL token domain queries to obtain the threshold and the averaging vector.

10. The computer-readable storage device of claim 9, wherein the program code for transforming the plurality of SQL queries and the new SQL query into SQL token domain queries includes program code for searching each symbol of a SQL query for a respective associated token and for replacing each symbol with its respective associated token.

11. The computer-readable storage device of claim 8, wherein the program code for obtaining a filtered matrix includes program code for obtaining a filtered matrix by applying diffusion maps to a matrix derived from the n-gram analysis.

12. The computer-readable storage device of claim 8, wherein the random vector is a Gaussian random vector.

13. A method for detecting a structured query language (SQL) injection attack, the method performed by a computer executing computer-readable code embodied on a computer-readable storage device, the method comprising the steps of:
- a) in a training phase:
    - i. generating, by the computer, a plurality of n-gram distributions of SQL token domain queries,
    - ii. computing an averaging vector,
    - iii. calculating a respective inner product of each n-gram distribution with a random vector, and
    - iv. based on the inner products, determining a threshold; and
- b) in a detection phase:
    - i. transforming, by the computer, a new SQL query into a new SQL token domain query, and
    - ii. applying a n-gram analysis together with the threshold and the averaging vector to the new SQL token domain query to determine whether or not the new SQL domain query is an injection attack query.

14. The method of claim 13, wherein each n-gram distribution has at least one sequence, and wherein the computing an averaging vector includes computing an averaging vector which includes an average frequency of every sequence in the n-gram distributions.

15. The method of claim 13, wherein the detection phase is performed online.

16. The method of claim 13, wherein the detection phase is performed offline.

17. The method of claim 13, wherein the transforming a new SQL query into a SQL token domain query includes searching each symbol of the new SQL query for a respective associated token and replacing each symbol with its respective associated token.

18. The method of claim 13, wherein the random vector is a Gaussian random vector.

19. The method of claim 13, wherein determining a threshold includes choosing a maximum of the inner products as the threshold.

* * * * *